(12) United States Patent
Inagaki

(10) Patent No.: US 6,437,897 B1
(45) Date of Patent: Aug. 20, 2002

(54) LASER SCANNING APPARATUS

(75) Inventor: Yoshihiro Inagaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/597,261

(22) Filed: Jun. 20, 2000

(30) Foreign Application Priority Data

Jun. 24, 1999 (JP) .......................................... 11-178763

(51) Int. Cl.7 .............................................. G02B 26/08
(52) U.S. Cl. ...................... 359/205; 359/207; 359/204; 359/216
(58) Field of Search ................................ 359/204–207, 359/216–219, 716; 347/233, 238, 243, 244, 258–261

(56) References Cited

U.S. PATENT DOCUMENTS

| | | |
|---|---|---|
| 5,648,865 A | 7/1997 | Iizuka |
| 5,737,112 A | 4/1998 | Iizuka |
| 5,774,249 A * | 6/1998 | Shiraishi et al. ............. 359/205 |
| 5,883,732 A * | 3/1999 | Takada et al. ............. 359/207 |

FOREIGN PATENT DOCUMENTS

| | | |
|---|---|---|
| JP | 08248308 | 9/1996 |
| JP | 09033850 | 2/1997 |
| JP | 10054952 | 2/1998 |
| JP | 10319317 | 12/1998 |

* cited by examiner

*Primary Examiner*—James Phan
(74) *Attorney, Agent, or Firm*—Burns, Doane, Swecker & Mathis, LLP

(57) ABSTRACT

A laser scanning apparatus has a light source device for emitting a laser beam, a deflector for deflecting the laser beam so as to scan a scanned surface with the laser beam, and a scanning optical system disposed in the optical path of the laser beam so as to focus the laser beam on the scanned surface. The scanning optical system is composed of three or more lens elements, of which the lens element disposed closest to the deflector and the lens element disposed closest to the scanned surface each have a surface that is so shaped that the curvature thereof as viewed on a sectional plane along the sub scanning direction varies independently of the shape thereof in the main scanning direction.

7 Claims, 35 Drawing Sheets

LASER SCANNING APPARATUS

This application is based on application No. H11-178763 filed in Japan on Jun. 24, 1999, the entire content of which is hereby incorporated by reference.

BACKGROUND OF THE INVENTION

1. Field of the Invention

The present invention relates to a laser scanning apparatus for use in, for example, a laser printer.

2. Description of the Prior Art

Conventionally, in the field of laser scanning apparatuses, a technique has been proposed, for example in Japanese Patent Application Laid-Open H9-33850, whereby, of all the surfaces constituting a scanning lens, two are each so shaped that their radius of curvature as viewed on a sectional plane along the sub scanning direction varies independently of their shape in the main scanning direction. This makes it possible to properly correct curvature of field in the sub scanning direction and unevenness of optical magnification in the sub scanning direction. Another such technique is proposed in Japanese Patent Application Laid-Open H8-248308, which uses a single-element scanning lens having free-form surfaces on both sides. This also helps correct curvature of field.

However, the arrangement proposed in Japanese Patent Application Laid-Open H9-33850 mentioned above suffers from so-called groove-shaped aberration, which hampers proper focusing of a laser beam and thereby degrades the image formed. Moreover, this arrangement offers only such a degree of freedom in the design of the lens surface shapes in the sub scanning direction as to allow correction of curvature of field and unevenness of magnification in the sub scanning direction, and therefore does not allow satisfactory correction of groove-shaped aberration. As a result, in particular in cases where scanning is performed through a comparatively wide angle, it is not possible to achieve proper focusing of a laser beam at the periphery of the image formed.

Furthermore, in this arrangement, the lens elements constituting a scanning optical system are designed to be laterally symmetrical, and thus the lateral asymmetry inherent in a polygon mirror acts to degrade the overall optical performance. The lateral asymmetry inherent in a polygon mirror exerts a particularly marked effect when a scanning optical system is adapted for a wider scanning angle. In general, in a laser scanning optical system, the scanning width is determined as the focal length of the scanning optical system in the main scanning direction multiplied by the deflection angle. Thus, to obtain a given scanning width, the narrower the deflection angle a scanning optical system is designed to have, the longer its focal length needs to be made. This inevitably requires that the entire apparatus be made unduly large.

Similarly, also the arrangement proposed in Japanese Patent Application Laid-Open H8-248308 mentioned above suffers from groove-shaped aberration, which hampers proper focusing of a laser beam and thereby degrades the image formed. Moreover, in this arrangement, it is difficult to correct the unevenness of magnification in the sub scanning direction.

SUMMARY OF THE INVENTION

An object of the present invention is to provide a laser scanning apparatus that allows proper correction of curvature of field in the sub scanning direction, unevenness of optical magnification in the sub scanning direction, and groove-shaped aberration and that thus offers images of satisfactory quality.

Another object of the present invention is to provide a laser scanning apparatus that allows high-speed image formation by the use of a plurality of beams.

To achieve the above objects, according to one aspect of the present invention, a laser scanning apparatus is provided with: a light source device for emitting a laser beam; a deflector for deflecting the laser beam so as to scan a scanned surface with the laser beam; and a scanning optical system disposed in the optical path of the laser beam so as to focus the laser beam on the scanned surface. Here, the scanning optical system is composed of three or more lens elements, of which the lens element disposed closest to the deflector and the lens element disposed closest to the scanned surface each have a surface that is so shaped that the curvature thereof as viewed on a sectional plane along the sub scanning direction varies independently of the shape thereof in the main scanning direction.

According to another aspect of the present invention, a laser scanning apparatus is provided with: a light source device for emitting a laser beam; a deflector for deflecting the laser beam so as to scan a scanned surface with the laser beam; and a scanning optical system disposed in the optical path of the laser beam so as to focus the laser beam on the scanned surface. Here, the scanning optical system has at least three surfaces that are each so shaped that the curvature thereof as viewed on a sectional plane along the sub scanning direction varies independently of the shape thereof in the main scanning direction.

According to another aspect of the present invention, a laser scanning apparatus is provided with: a light source device for emitting a laser beam; a deflector for deflecting the laser beam so as to scan a scanned surface with the laser beam; and a scanning optical system disposed in the optical path of the laser beam so as to focus the laser beam on the scanned surface. Here, the scanning optical system has at least two optical components each having a surface that is so shaped that the curvature thereof as viewed on a sectional plane along the sub scanning direction varies independently of the shape thereof in the main scanning direction and laterally asymmetrically.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
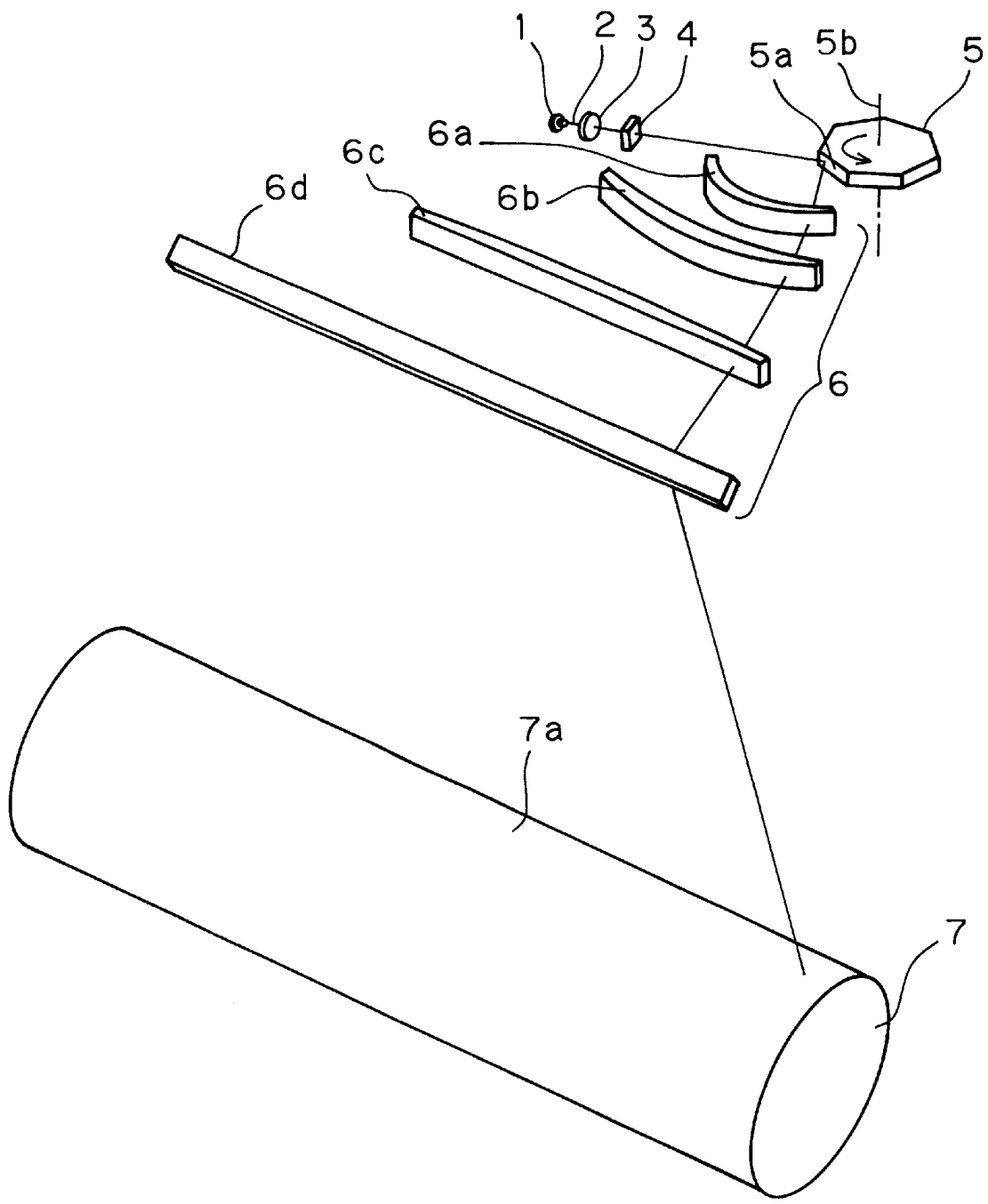
FIG. 1 is a perspective view showing an outline of the construction of a first embodiment of the invention.

Hereinafter, embodiments of the present invention will be described with reference to the accompanying drawings. FIG. 1 is a perspective view showing an outline of the construction of the laser scanning apparatus of a first embodiment of the invention. As shown in this figure, a laser beam 2 emitted from a laser source 1 is passed through a collimator lens 3 so as to be formed into a parallel beam, and is then passed through a cylindrical lens 4 so as to be focused, only in the sub scanning direction, in the vicinity of a reflecting surface 5a of a polygon mirror 5.

The laser beam is then deflected by a polygon mirror 5 that rotates about a rotational axis 5b as indicated by an arrow, and is then refracted and reflected by a scanning optical system 6 in such a way as to be focused on an image surface 7a on a cylindrical photoconductive drum 7, forming a latent image thereon. As the polygon mirror 5 rotates, the individual reflecting surfaces 5a thereof rotate, and this permits the laser beam 2 to scan the image surface 7a on the rotating photoconductive drum 7 and thereby form the latent image thereon. The scanning optical system 6 is composed of, in the order in which the laser beam passes through, a first scanning lens 6a, a second scanning lens 6b, a third scanning lens 6c, and a scanning mirror 6d. It is to be noted that, basically, the construction described above is common to all of the first to sixth embodiments of the present invention described below.

Figure 2A:
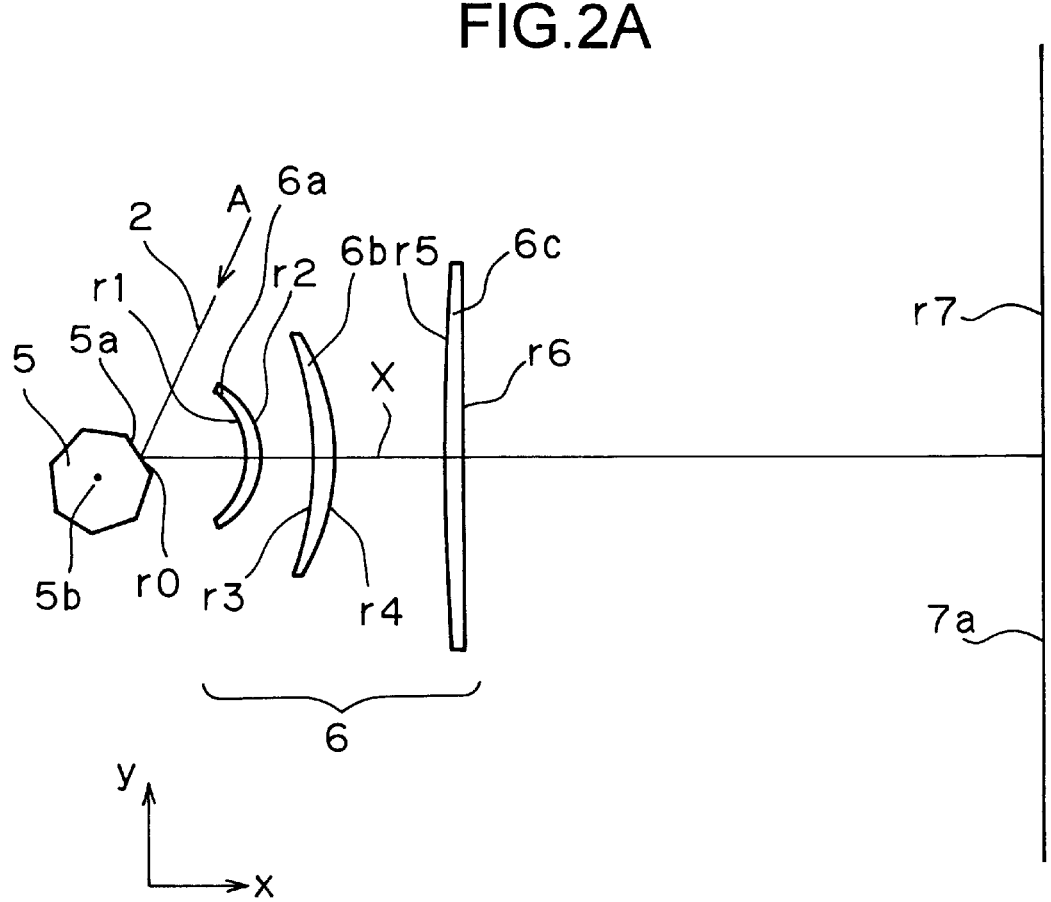
FIGS. 2A and 2B are diagrams showing the configuration of the scanning optical system in the first embodiment.
Figure 2B:
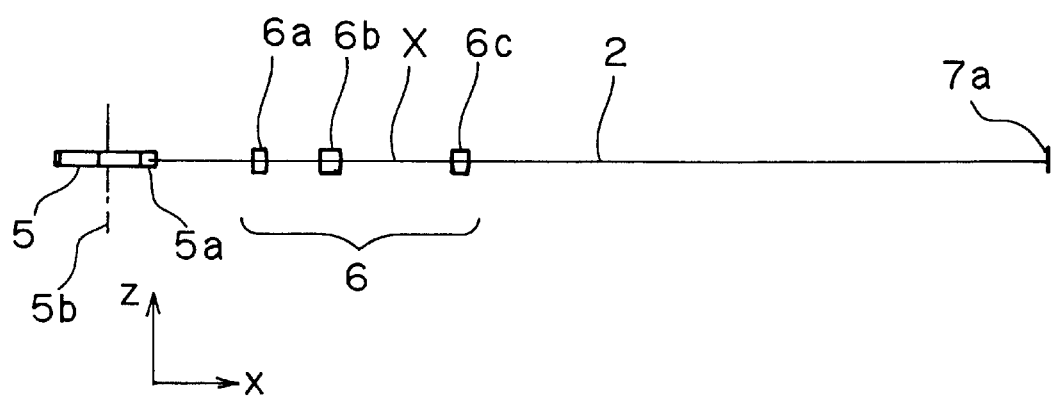

FIGS. 2A and 2B are diagrams showing the configuration of the scanning optical system in the first embodiment of the invention, with FIG. 2A showing a plan view and FIG. 2B showing a side view. As shown in these figures, the coordinate system used here is assumed to have an x axis along the optical axis X (the optical axis of the light reflected from the polygon mirror 5 at a deflection angle of 0°; this applies throughout the following descriptions), a y axis along the main scanning direction, and a z axis along the sub scanning direction. Here, the laser beam 2 is incident on a reflecting surface 5a of the polygon mirror 5 from the direction indicated by an arrow A in FIG. 2A.

The coordinate system has its origin at the point where the reflecting surface 5a and the optical axis X intersect. In FIGS. 2A and 2B, the scanning mirror 6d is omitted, and accordingly the optical path is illustrated as not bent thereby.

Individual optical surfaces are identified with the following surface numbers: the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, the entrance-side surface of the third scanning lens 6c with r5, the exit-side surface of the same with r6, and the image surface 7a on the photoconductive drum 7 with r7.

Table 1 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first, second, and third scanning lenses 6a, 6b, and 6c of the scanning optical system 6, and the image surface 7a of the photoconductive drum 7. All distances are given in mm.

In this scanning optical system, the second and fifth surfaces are free-form surfaces, whose surface shape is defined by $$x = \sum_{i=0}^{10} \sum_{j=0}^{2} a_{ij} y^i z^j \quad (1)$$

Here, as described above, the coordinate system is assumed to have an x axis along the optical axis, a y axis along the main scanning direction, and a z axis along the sub scanning direction. In Formula (1) noted above, the terms with z of degree 0 represent the surface shape in the main scanning direction. The surface shape as viewed on a sectional plane along the sub scanning direction is parabolic, and the terms with z of degree 2 represent the curvature of the parabola at or near the vertex thereof. The terms with z of degree 1 are all equal to 0. Accordingly, the vertex of the parabola as viewed on a sectional plane along the sub scanning direction lies on the x-y plane irrespective of its position in the main scanning direction.

Tables 2 and 3 show, for the second and fifth surfaces respectively, the actual values of the coefficient $a_{ij}$ in Formula (1) defining the surface shape, for various values of y of degree i and z of degree j, in the form of a matrix having i rows and j columns. In these tables En (where n is an integer number) represents $\times 10^n$; for example E-03 represents $\times 10^{-3}$.

Table 4 shows, for the fourth surface, the coefficients of different degrees to be substituted in the formulae that define the surface shape of the aspherical surface. The surface shape of the aspherical surface is defined by $$X = X_0 + \Sigma A_i Y^i \quad (a)$$

$$X_0 = CY^2 / \{1 + (1 - \epsilon C^2 Y^2)^{1/2}\} \quad (b)$$

where

X represents the displacement from the reference surface along the optical axis, Y represents the height in a direction perpendicular to the optical axis, C represents the paraxial curvature, $\epsilon$ represents the quadric surface parameter, and $A_i$ represents the aspherical surface coefficient of degree i.

Figure 3A:
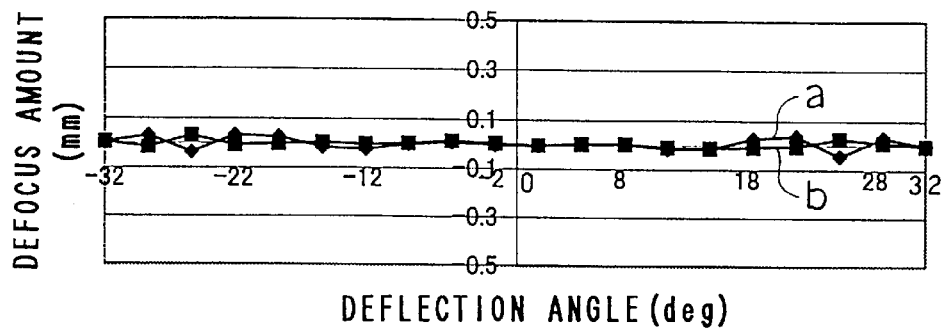
FIGS. 3A, 3B, 3C and 3D are diagrams showing the optical performance of the scanning optical system in the first embodiment.
Figure 3B:
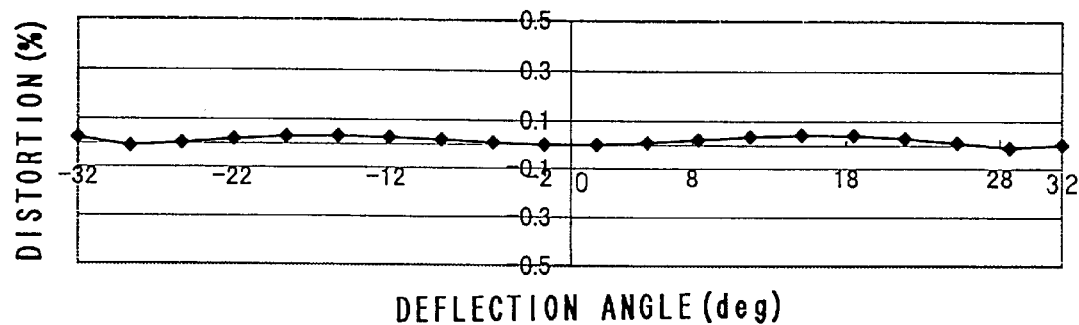
Figure 3C:
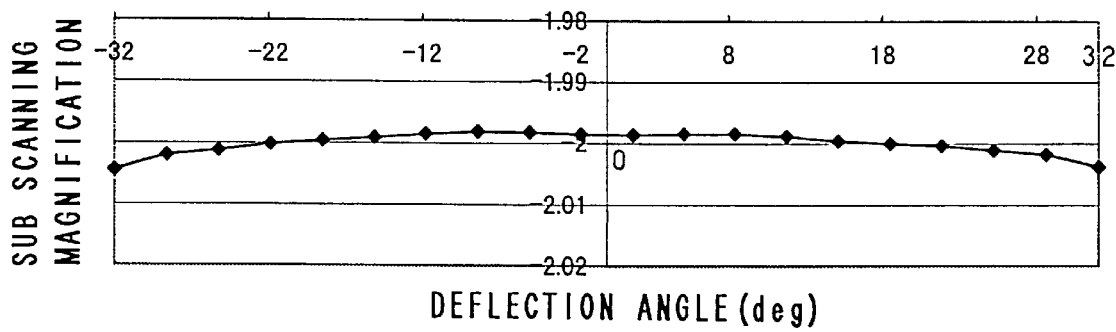
Figure 3D:
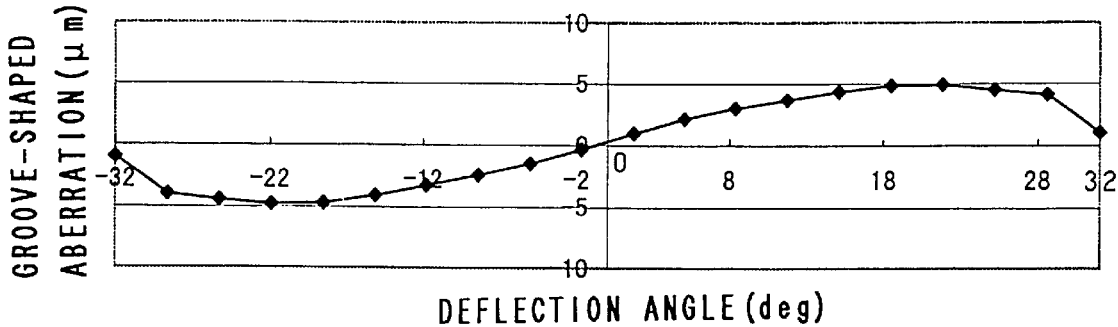

FIGS. 3A to 3D are diagrams showing the optical performance of the scanning optical system in this embodiment, with FIG. 3A showing curvature of field, FIG. 3B showing distortion, FIG. 3C showing magnification in the sub scanning direction, and FIG. 3D showing groove-shaped aberration. FIG. 3A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a" and the curvature of field in the main scanning direction is indicated by a solid line "b".

FIG. 3B shows distortion, with the deflection angle (°) taken along the horizontal axis and the degree of distortion (%) taken along the vertical axis. FIG. 3C shows magnification in the sub scanning direction, with the deflection angle (°) taken along the horizontal axis and the magnification in the sub scanning direction taken along the vertical axis. FIG. 3D shows groove-shaped distortion, with the deflection angle (°) taken along the horizontal axis and the amount of groove-shaped distortion ($\mu$m) taken along the vertical axis. Here, as will be described in detail later, groove-shaped distortion refers to the deviation, as observed in the main scanning direction, of the peripheral ray from the principal ray, as viewed in the sub scanning direction.

These figures show that various types of aberration are corrected properly in this embodiment. Here, the scanning optical system is composed of three or more scanning lenses, of which the one disposed closest to the deflector (polygon mirror) and the lens disposed closest to the scanned surface (image surface) each have a free-form surface that is so shaped that its radius of curvature as viewed on a sectional plane along the sub scanning direction varies independently of its shape in the main scanning direction. In addition, the lens or lenses disposed in between include an axisymmetric aspherical surface.

Figure 4:
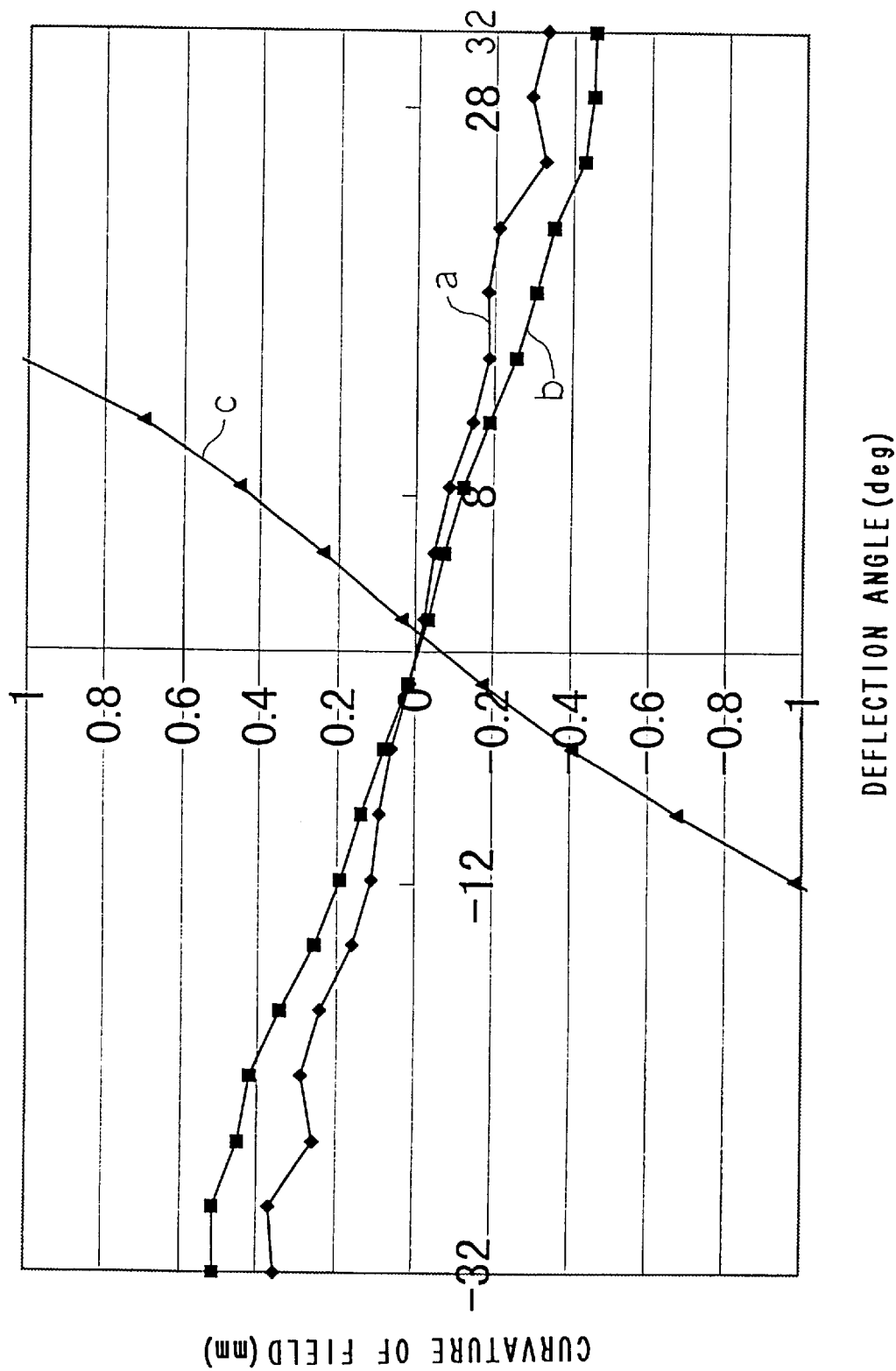
FIG. 4 is a diagram showing the optical performance of a practical example of the first embodiment as compared to other examples.

FIG. 4 is a diagram showing the optical performance of a practical example of the first embodiment as compared to other examples. This figure shows curvature of field observed in this embodiment (Practical Example 1) and in two other examples (Comparison Examples 1 and 2), with the deflection angle (°) taken along the horizontal axis and the curvature of field (mm) taken along the vertical axis. Here, the curvature of field observed in Practical Example 1 is indicated by a solid line "a", the curvature of field observed in Comparison Example 1 is indicated by a solid line "b", and the curvature of field observed in Comparison Example 2 is indicated by a solid line "c". Each graph shows the curvature of field observed in the sub scanning direction when the fifth surface is moved 0.1 mm parallel to itself in the main scanning direction.

As described above in connection with the first embodiment, whereas the second and fifth surfaces are free-form surfaces in Practical Example 1, the fourth and fifth surfaces are free-form surfaces in Comparison Example 1, and the fifth and sixth surfaces are free-form surfaces in Comparison Example 2. In other words, in Practical Example 1, the first and third scanning lenses each have one free-form surface; in Comparison Example 1, the second and third scanning lenses each have one free-form surface; in Comparison Example 2, the third scanning lens has two free-form surfaces.

The graphs of FIG. 4 show that this embodiment (Practical Example 1) exhibits smaller variation in curvature of field than the two comparison examples. These three examples are the same in that they all have a free-form surface as their fifth surface, which is moved. However, where to dispose another free-form surface determines how the curvature in the sub scanning direction varies, and this makes the three examples different in sensitivity to errors.

Figure 5:
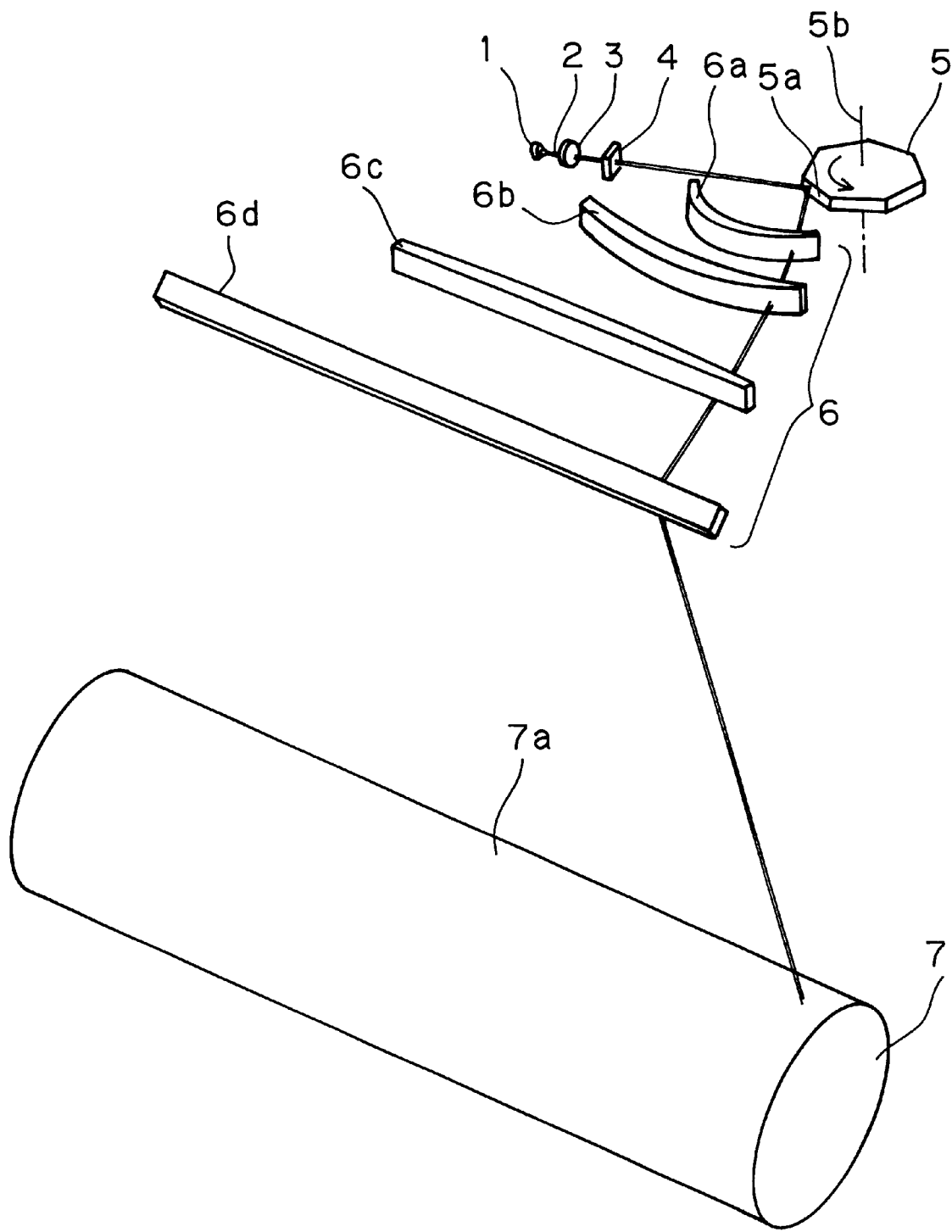
FIG. 5 is a perspective view showing an outline of the construction of a modified example of the first embodiment.

FIG. 5 is a perspective view showing an outline of the construction of a modified example of the first embodiment. As shown in this figure, in this example, the laser source 1 is a multiple-beam laser. In other respects, this example has the same construction as shown in FIG. 1. A multiple-beam laser imposes stricter requirements in terms of evenness of magnification in the sub scanning direction. This is because, whereas, with a single beam, evenness of magnification in the sub scanning direction contributes solely to evenness of beam diameter, with multiple beams, magnification in the sub scanning direction determines the intervals between a plurality of scanning lines along which image formation progresses concurrently. Therefore, a low degree of evenness of magnification in the sub scanning direction causes the intervals between scanning lines to vary with the position in the main scanning direction, and thus adversely affects the image formed. Accordingly, an arrangement, like one embodying the present invention, that offers a high degree of evenness of magnification in the sub scanning direction is particularly useful in applications that involve multiple beams.

Figure 6:
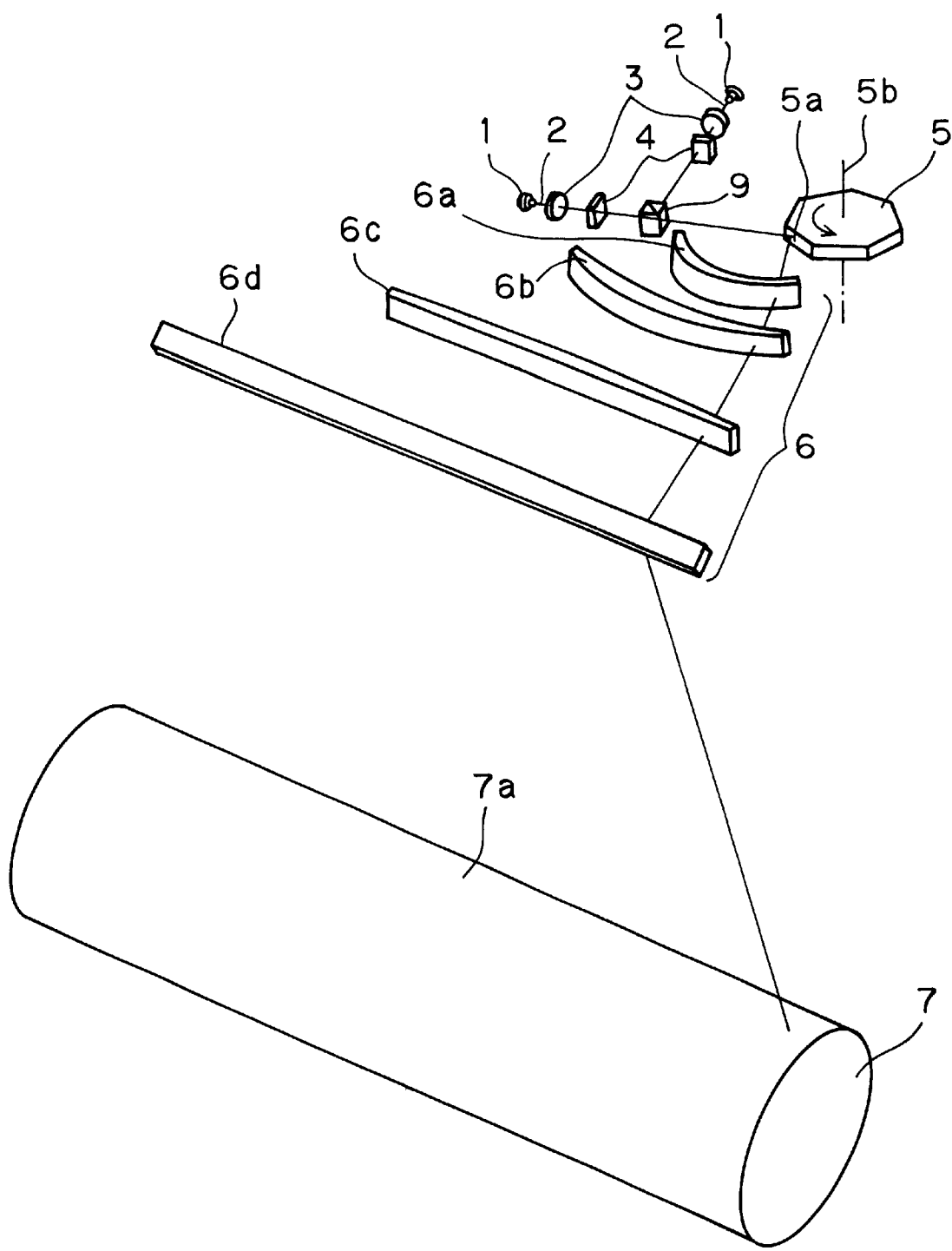
FIG. 6 is a perspective view showing an outline of the construction of another modified example of the first embodiment.

FIG. 6 is a perspective view showing an outline of the construction of another modified example of the first embodiment. As shown in this figure, in this example, a plurality of laser sources 1, a plurality of collimator lenses 3, and a plurality of cylindrical lenses 4 are provided. The laser beams 2 emitted individually from the laser sources 1 are passed through the corresponding collimator lenses 3 so as to be formed into parallel beams, are then passed through the corresponding cylindrical lenses 4, and are then integrated together by an integrator 9, such as a beam splitter, so as to be directed to a polygon mirror 5. In other respects, this example has the same construction as shown in FIG. 1. The laser beams are integrated together in such a way as to travel in directions a slight angle apart from one another so that they are focused on spots a predetermined interval apart from one another in the sub scanning direction on a scanned surface (image surface).

Figure 7A:
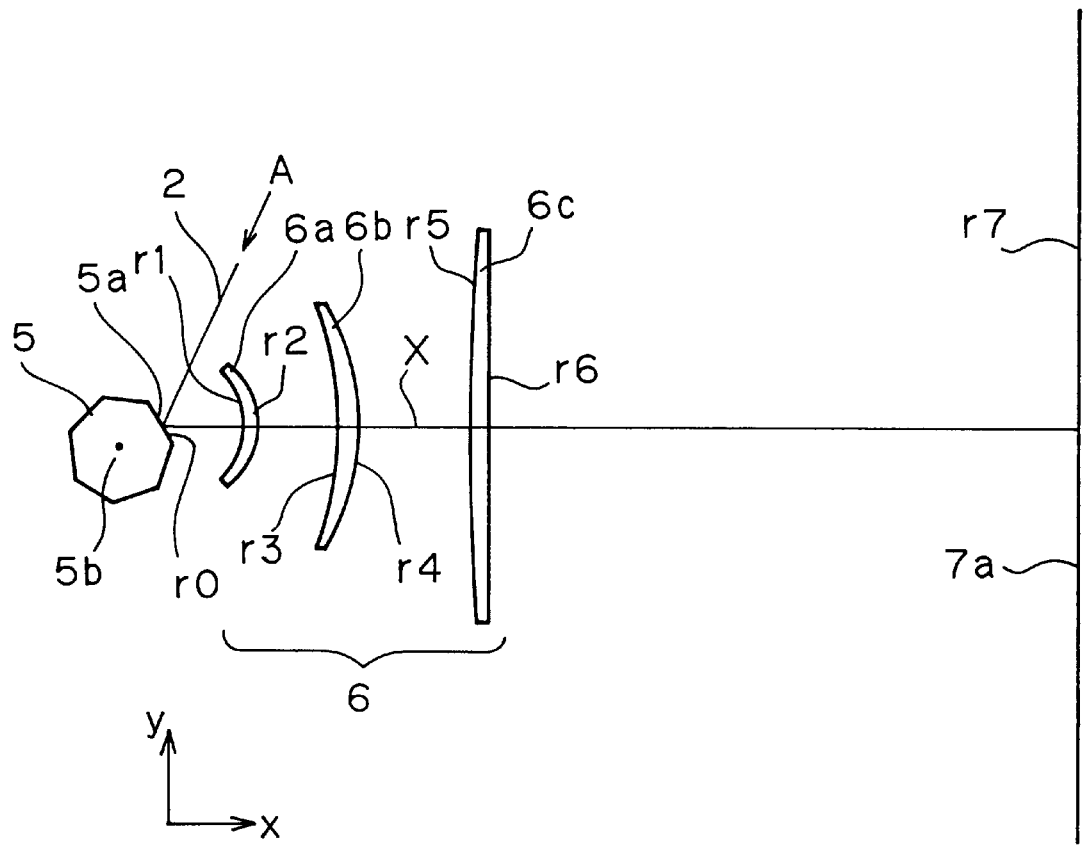
FIGS. 7A and 7B are diagrams showing the configuration of the scanning optical system in a second embodiment of the invention.
Figure 7B:
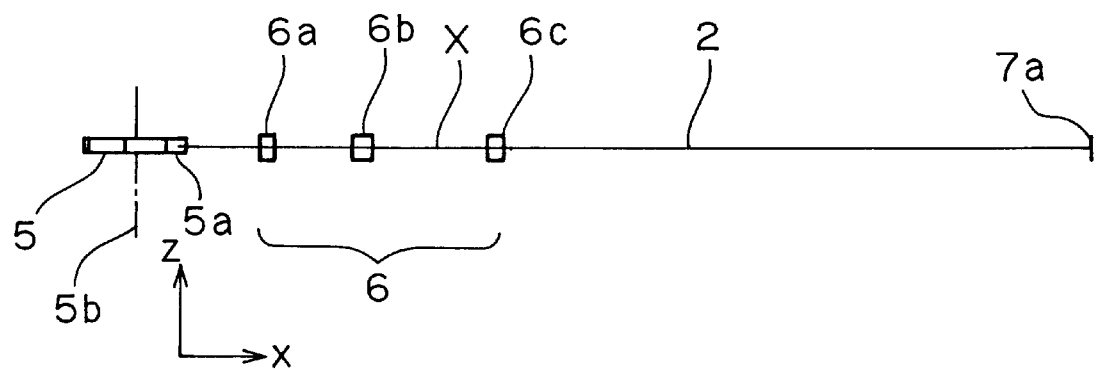

FIGS. 7A and 7B are diagrams showing the configuration of the scanning optical system in a second embodiment of the invention, with FIG. 7A showing a plan view and FIG. 7B showing a side view. As shown in these figures, the coordinate system used here is assumed to have an x axis along the optical axis X, a y axis along the main scanning direction, and a z axis along the sub scanning direction. Here, the laser beam 2 is incident on a reflecting surface 5a of the polygon mirror 5 from the direction indicated by an arrow A in FIG. 7A.

The coordinate system has its origin at the point where the reflecting surface 5a and the optical axis X intersect. In FIGS. 7A and 7B, the scanning mirror 6d is omitted, and accordingly the optical path is illustrated as not bent thereby. Individual optical surfaces are identified with the following surface numbers: the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, the entrance-side surface of the third scanning lens 6c with r5, the exit-side surface of the same with r6, and the image surface 7a on the photoconductive drum 7 with r7.

Table 5 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first, second, and third scanning lenses 6a, 6b, and 6c of the scanning optical system 6, and the image surface 7a of the photoconductive drum 7. All distances are given in mm.

In this scanning optical system, the second and fifth surfaces are free-form surfaces, whose surface shape is defined by Formula (1) noted previously. Tables 6 and 7 show, for the second and fifth surfaces respectively, the actual values of the coefficient $a_{ij}$ in Formula (1) defining the surface shape, for various values of y of degree i and z of degree j, in the form of a matrix having i rows and j columns. In these tables En (where n is an integer number) represents $\times 10^n$; for example E-03 represents $\times 10^{-3}$.

Table 8 shows, for the fourth surface, the coefficients of different degrees to be substituted in the formulae that define the surface shape of the aspherical surface.

Figure 8A:
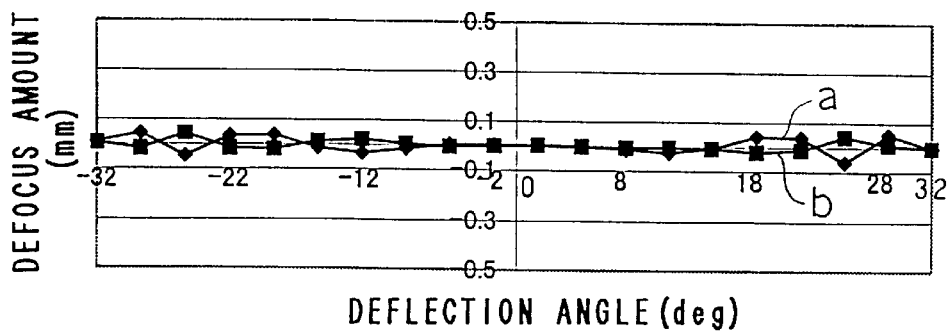
FIGS. 8A, 8B, 8C and 8D are diagrams showing the optical performance of the scanning optical system in the second embodiment.
Figure 8B:
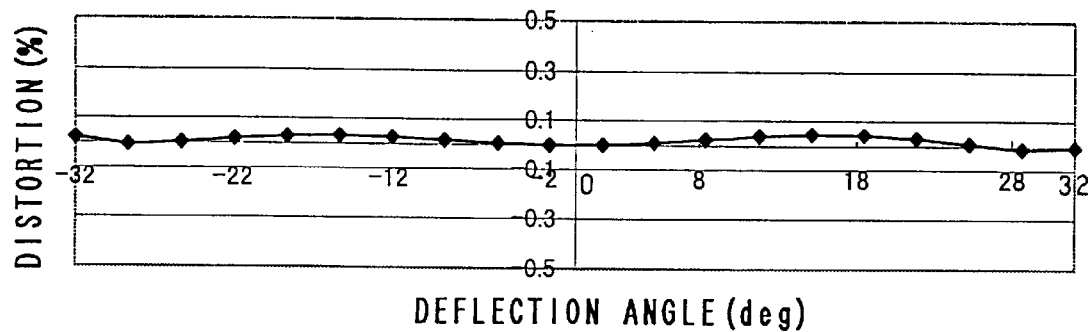
Figure 8C:
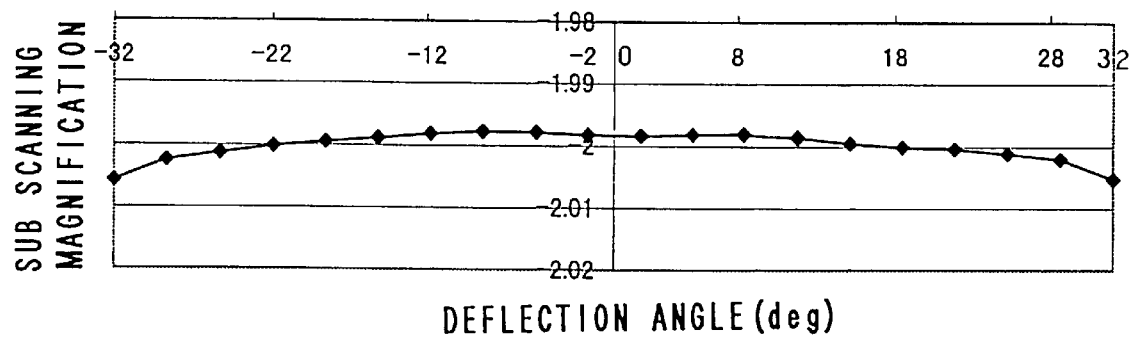
Figure 8D:
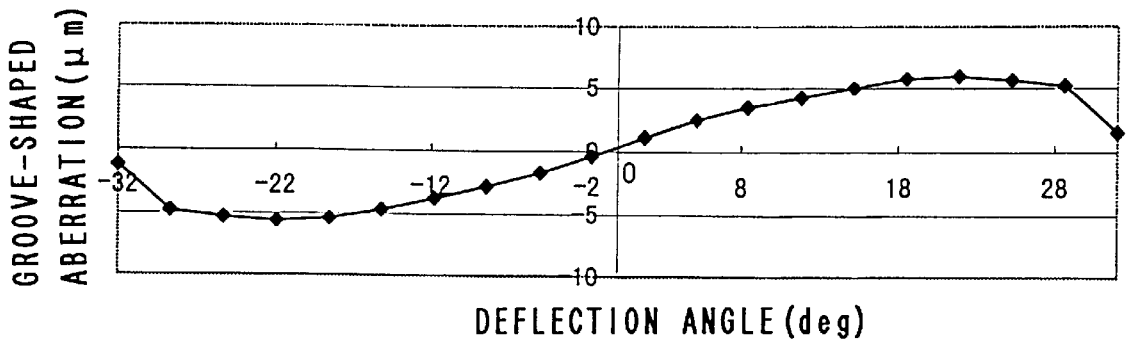

FIGS. 8A to 8D are diagrams showing the optical performance of the scanning optical system in this embodiment, with FIG. 8A showing curvature of field, FIG. 8B showing distortion, FIG. 8C showing magnification in the sub scanning direction, and FIG. 8D showing groove-shaped aberration. FIG. 8A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 8B shows distortion, with the deflection angle (°) taken along the horizontal axis and the degree of distortion (%) taken along the vertical axis. FIG. 8C shows magnification in the sub scanning direction, with the deflection angle (°) taken along the horizontal axis and the magnification in the sub scanning direction taken along the vertical axis. FIG. 8D shows groove-shaped distortion, with the deflection angle (°) taken along the horizontal axis and the amount of groove-shaped distortion ($\mu$m) taken along the vertical axis.

These figures show that various types of aberration are corrected properly in this embodiment. Here, as in the first embodiment, the scanning optical system is composed of three or more scanning lenses, of which the one disposed closest to the deflector (polygon mirror) and the lens disposed closest to the scanned surface (image surface) each have a free-form surface that is so shaped that its radius of curvature as viewed on a sectional plane along the sub scanning direction varies independently of its shape in the main scanning direction. In addition, the lens or lenses disposed in between include an axisymmetric aspherical surface.

Figure 9A:
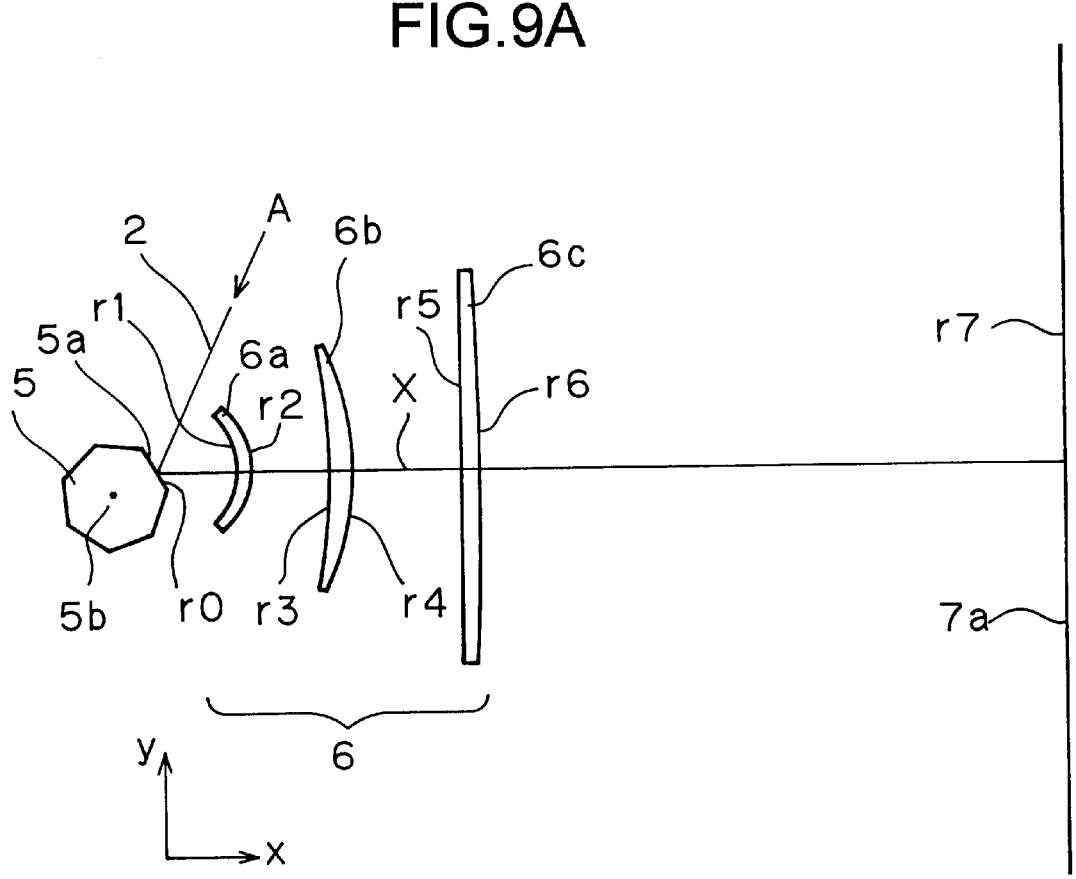
FIGS. 9A and 9B are diagrams showing the configuration of the scanning optical system in a third embodiment of the invention.
Figure 9B:
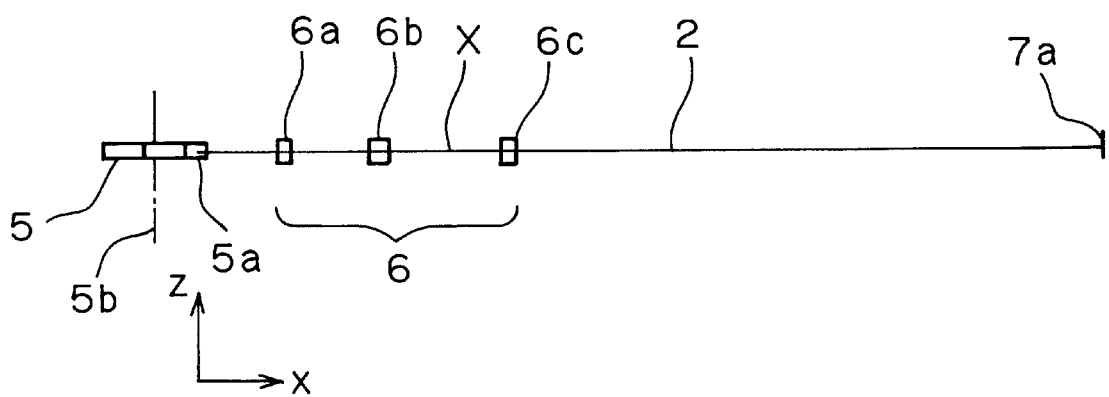

FIGS. 9A and 9B are diagrams showing the configuration of the scanning optical system in a third embodiment of the invention, with FIG. 9A showing a plan view and FIG. 9B showing a side view. As shown in these figures, the coordinate system used here is assumed to have an x axis along the optical axis X, a y axis along the main scanning direction, and a z axis along the sub scanning direction. Here, the laser beam 2 is incident on a reflecting surface 5a of the polygon mirror 5 from the direction indicated by an arrow A in FIG. 9A.

The coordinate system has its origin at the point where the reflecting surface 5a and the optical axis X intersect. In FIGS. 9A and 9B, the scanning mirror 6d is omitted, and accordingly the optical path is illustrated as not bent thereby.

Individual optical surfaces are identified with the following surface numbers: the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, the entrance-side surface of the third scanning lens 6c with r5, the exit-side surface of the same with r6, and the image surface 7a on the photoconductive drum 7 with r7.

Table 9 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first, second, and third scanning lenses 6a, 6b, and 6c of the scanning optical system 6, and the image surface 7a of the photoconductive drum 7. All distances are given in mm.

In this scanning optical system, the first and sixth surfaces are free-form surfaces, whose surface shape is defined by Formula (1) noted previously. Tables 10 and 11 show, for the first and sixth surfaces respectively, the actual values of the coefficient $a_{ij}$ in Formula (1) defining the surface shape, for various values of y of degree i and z of degree j, in the form of a matrix having i rows and j columns. In these tables En (where n is an integer number) represents $\times 10^n$; for example E-03 represents $\times 10^{-3}$.

Figure 10A:
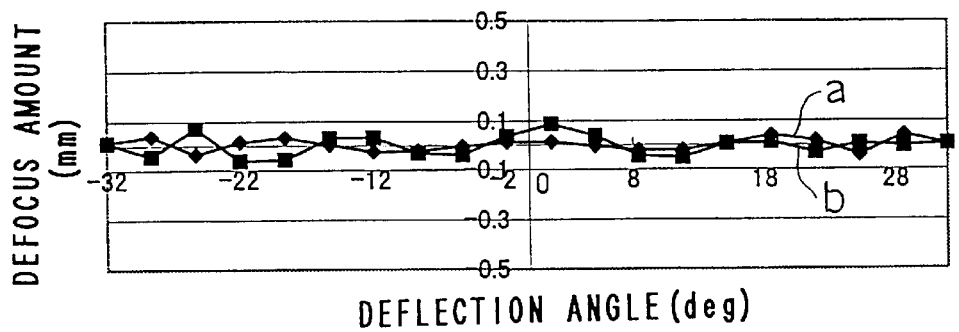
FIGS. 10A, 10B, 10C and 10D are diagrams showing the optical performance of the scanning optical system in the third embodiment.
Figure 10B:
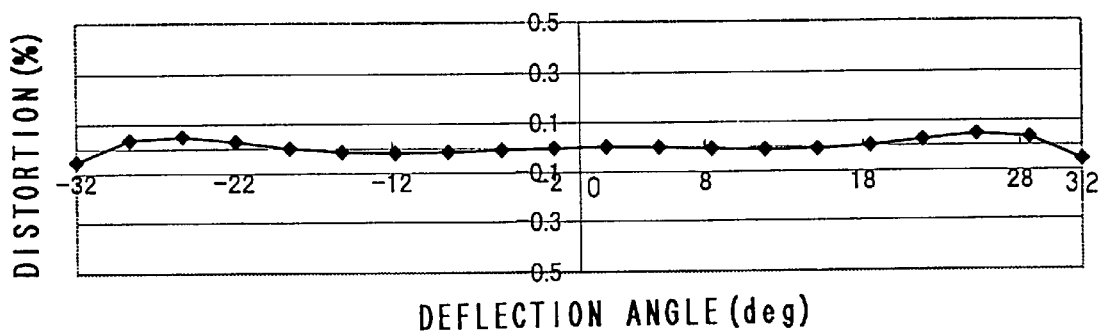
Figure 10C:
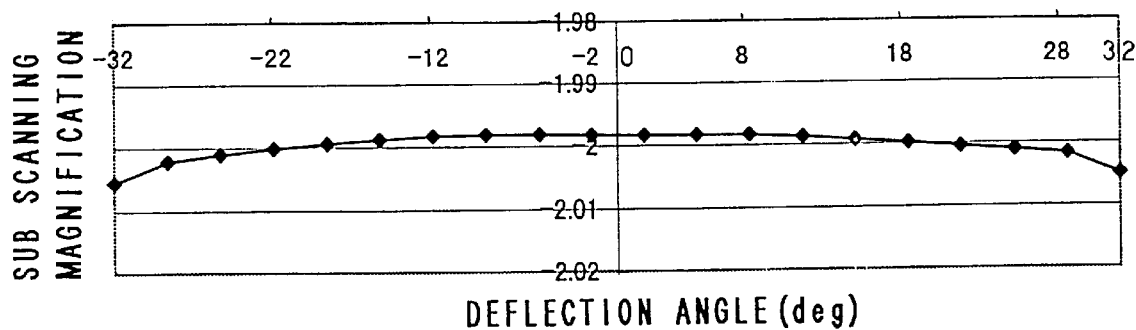
Figure 10D:
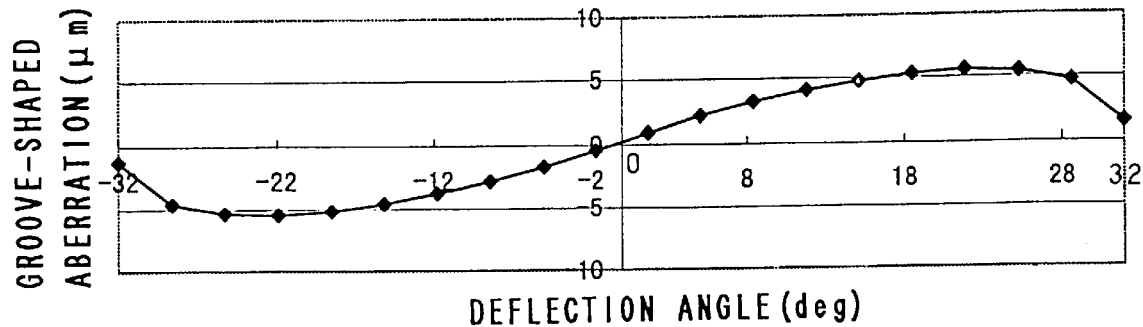

FIGS. 10A to 10D are diagrams showing the optical performance of the scanning optical system in this embodiment, with FIG. 10A showing curvature of field, FIG. 10B showing distortion, FIG. 10C showing magnification in the sub scanning direction, and FIG. 10D showing groove-shaped aberration. FIG. 10A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 10B shows distortion, with the deflection angle (°) taken along the horizontal axis and the degree of distortion (%) taken along the vertical axis. FIG. 10C shows magnification in the sub scanning direction, with the deflection angle (°) taken along the horizontal axis and the magnification in the sub scanning direction taken along the vertical axis. FIG. 10D shows groove-shaped distortion, with the deflection angle (°) taken along the horizontal axis and the amount of groove-shaped distortion ($\mu$m) taken along the vertical axis.

These figures show that various types of aberration are corrected properly in this embodiment. Here, as in the first embodiment, the scanning optical system is composed of three or more scanning lenses, of which the one disposed closest to the deflector (polygon mirror) and the lens disposed closest to the scanned surface (image surface) each have a free-form surface that is so shaped that its radius of curvature as viewed on a sectional plane along the sub scanning direction varies independently of its shape in the main scanning direction.

In the first to third embodiments described above, two free-form surfaces are formed on separate lenses. This permits the bending of those lenses to be controlled individually, and thus permits the shapes of the two free-form surfaces to be set comparatively freely. As a result, it is possible to correct properly three types of aberration, namely curvature of field in the sub scanning direction, unevenness of optical magnification in the sub scanning direction, and groove-shaped aberration.

Figure 11A:
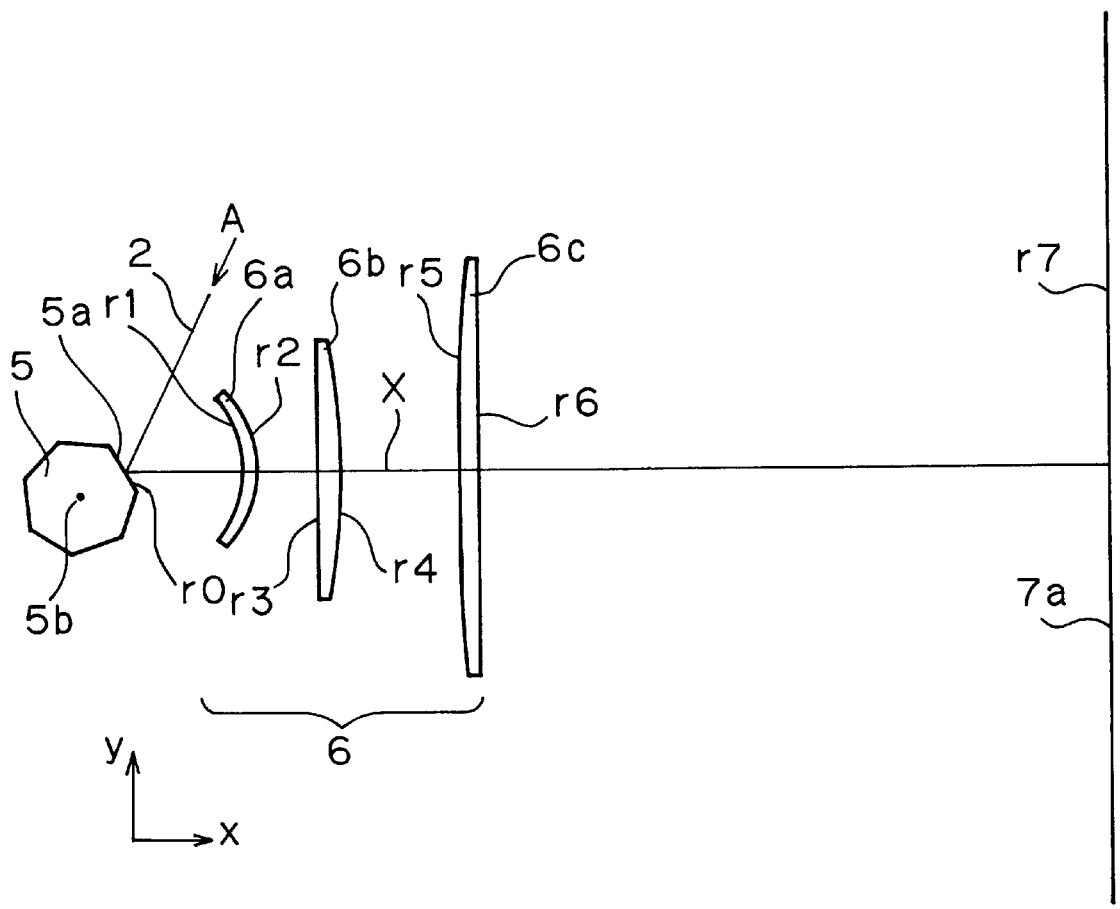
FIGS. 11A and 11B are diagrams showing the configuration of the scanning optical system in a fourth embodiment of the invention.
Figure 11B:
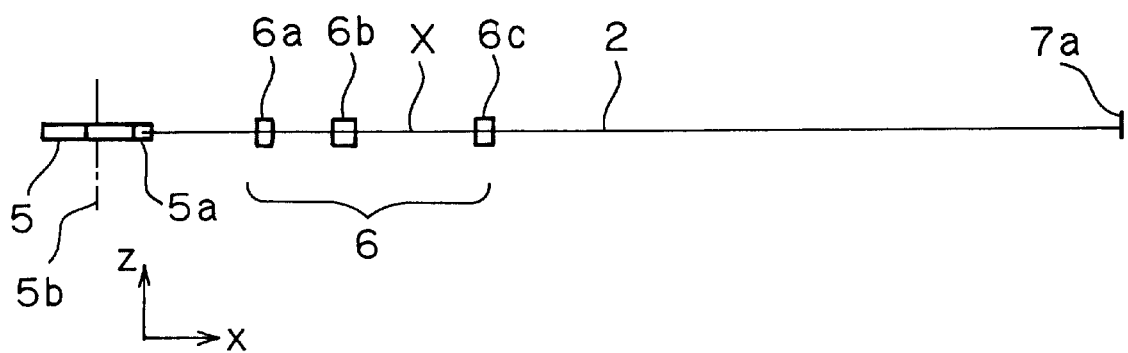

FIGS. 11A and 11B are diagrams showing the configuration of the scanning optical system in a fourth embodiment of the invention, with FIG. 11A showing a plan view and FIG. 11B showing a side view. As shown in these figures, the coordinate system used here is assumed to have an x axis along the optical axis X, a y axis along the main scanning direction, and a z axis along the sub scanning direction. Here, the laser beam 2 is incident on a reflecting surface 5a of the polygon mirror 5 from the direction indicated by an arrow A in FIG. 11A.

The coordinate system has its origin at the point where the reflecting surface 5a and the optical axis X intersect. In FIGS. 11A and 11B, the scanning mirror 6d is omitted, and accordingly the optical path is illustrated as not bent thereby. Individual optical surfaces are identified with the following surface numbers: the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, the entrance-side surface of the third scanning lens 6c with r5, the exit-side surface of the same with r6, and the image surface 7a on the photoconductive drum 7 with r7.

Table 12 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first, second, and third scanning lenses 6a, 6b, and 6c of the scanning optical system 6, and the image surface 7a of the photoconductive drum 7. All distances are given in mm.

In this scanning optical system, the second, fourth, and fifth surfaces are free-form surfaces, whose surface shape is defined by Formula (1) noted previously. Tables 13, 14 and 15 show, for the second, fourth, and fifth surfaces respectively, the actual values of the coefficient $a_{ij}$ in Formula (1) defining the surface shape, for various values of y of degree i and z of degree j, in the form of a matrix having i rows and j columns. In these tables En (where n is an integer number) represents $\times 10^n$; for example E-03 represents $\times 10^{-3}$.

Figure 12A:
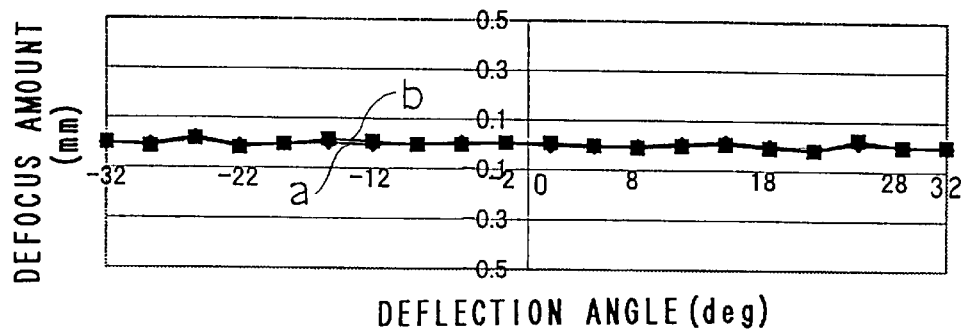
FIGS. 12A, 12B, 12C and 12D are diagrams showing the optical performance of the scanning optical system in the fourth embodiment.
Figure 12B:
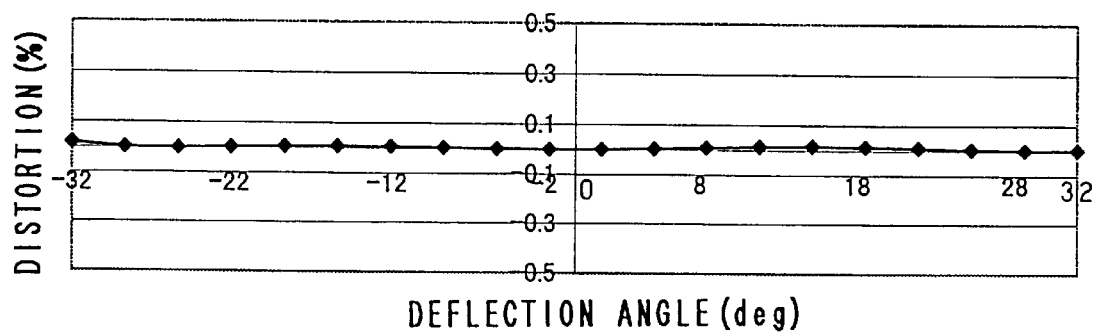
Figure 12C:
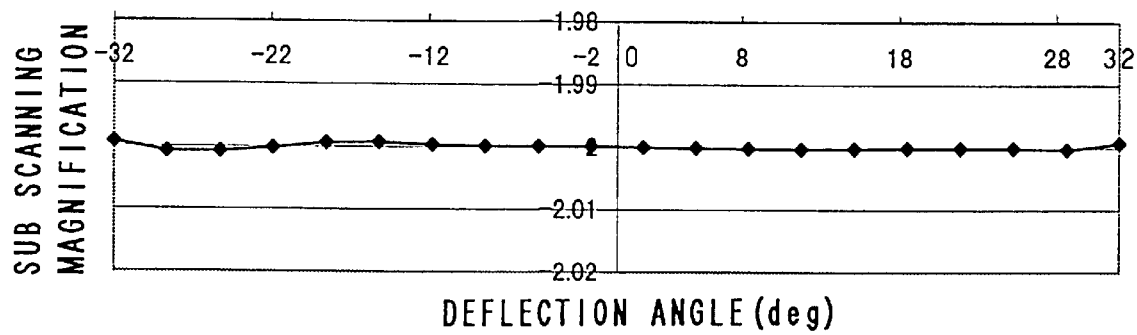
Figure 12D:
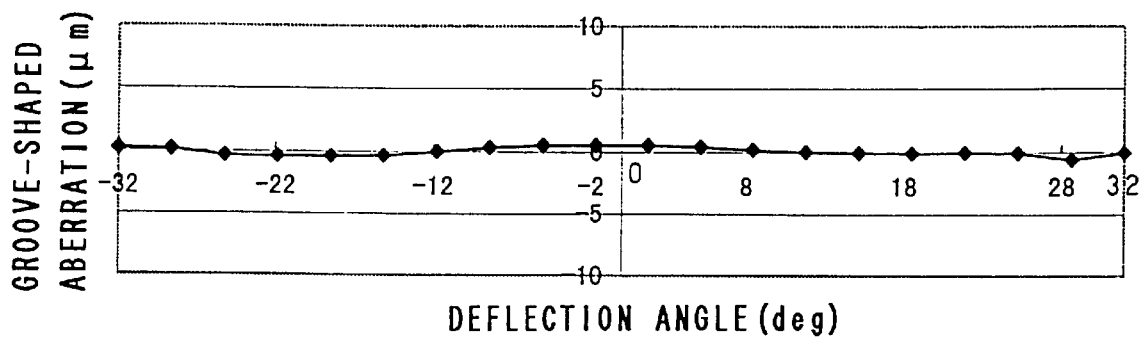

FIGS. 12A to 12D are diagrams showing the optical performance of the scanning optical system in this embodiment, with FIG. 12A showing curvature of field, FIG. 12B showing distortion, FIG. 12C showing magnification in the sub scanning direction, and FIG. 12D showing groove-shaped aberration. FIG. 12A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 12B shows distortion, with the deflection angle (°) taken along the horizontal axis and the degree of distortion (%) taken along the vertical axis. FIG. 12C shows magnification in the sub scanning direction, with the deflection angle (°) taken along the horizontal axis and the magnification in the sub scanning direction taken along the vertical axis. FIG. 12D shows groove-shaped distortion, with the deflection angle (°) taken along the horizontal axis and the amount of groove-shaped distortion ($\mu$m) taken along the vertical axis.

These figures show that various types of aberration are corrected properly in this embodiment. Here, the scanning optical system has three free-form surfaces that are each so shaped that their radius of curvature as viewed on a sectional plane along the sub scanning direction varies independently of their shape in the main scanning direction.

Figure 13:
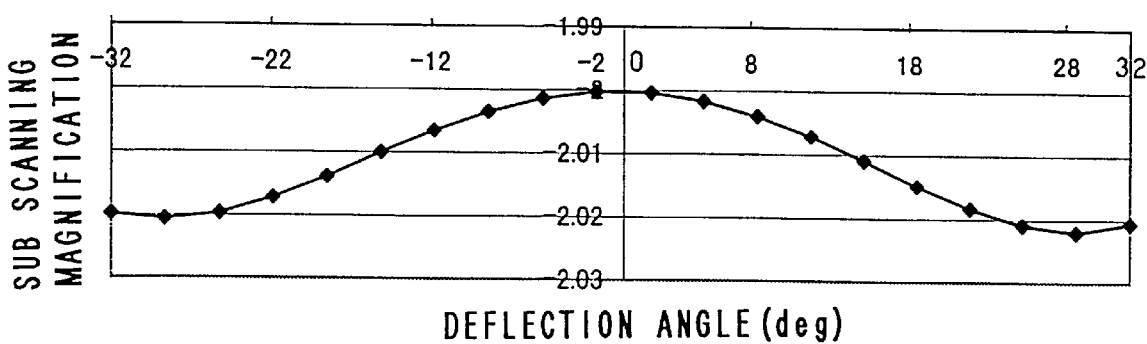
FIG. 13 is a diagram showing the optical performance of an example given for comparison with the fourth embodiment.

FIG. 13 is a diagram showing the optical performance of an example given for comparison with this embodiment. In this figure, the deflection angle (°) is taken along the horizontal axis, and the magnification in the sub scanning direction is taken along the vertical axis. This graph shows the unevenness of magnification in the sub scanning direction as observed when curvature of field in the sub scanning direction and groove-shaped aberration are corrected to the same degree as in this embodiment in an arrangement that has the same surface shapes in the main scanning direction as in this embodiment but that has the second surface made flat in the sub scanning direction. This arrangement offers only two degrees of freedom in aberration correction, and thus, as FIG. 13 shows, even through the two types of aberration mentioned just above can be corrected, the third type of aberration remains uncorrected.

It is to be noted that, also in this embodiment, the overall construction can be modified to cope with multiple beams in the same manner as shown in FIGS. 5 and 6.

Figure 14A:
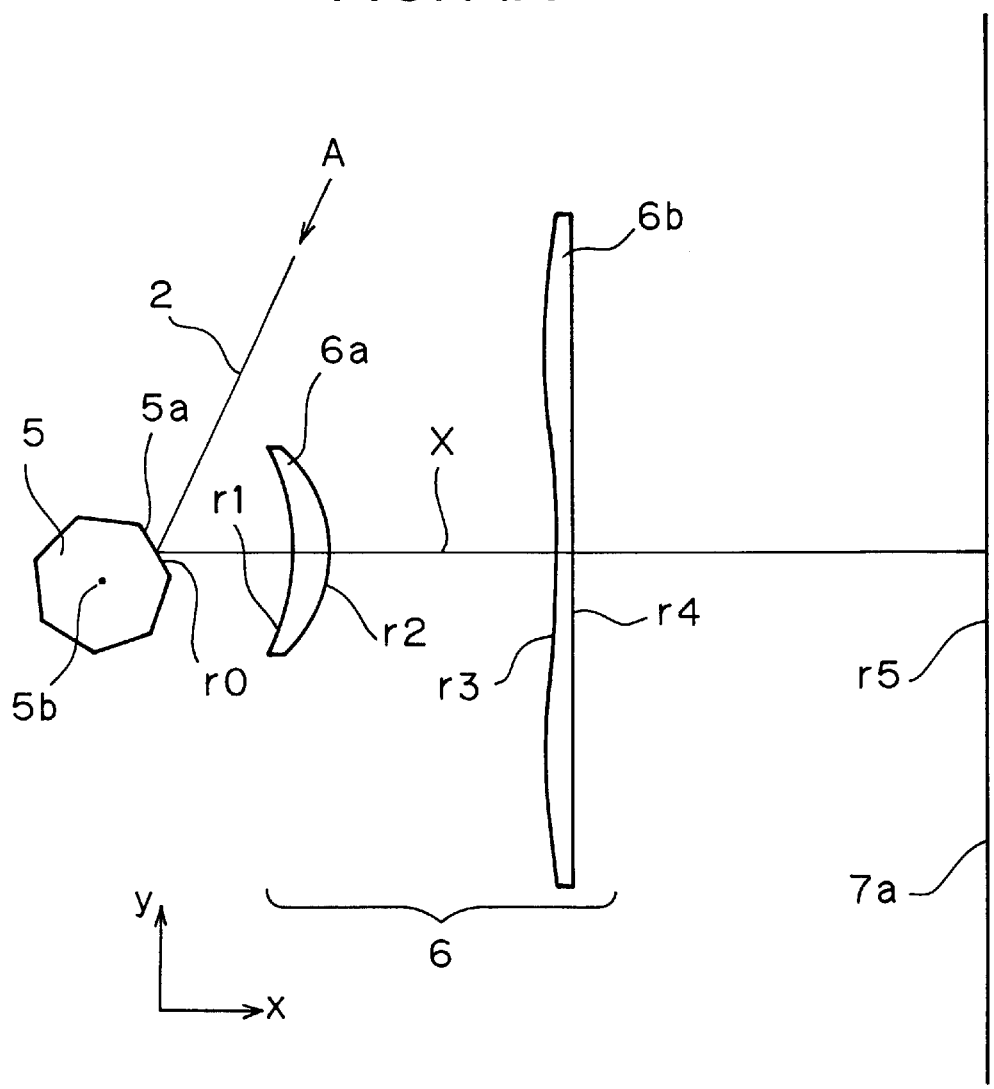
FIGS. 14A and 14B are diagrams showing the configuration of the scanning optical system in a fifth embodiment of the invention.
Figure 14B:
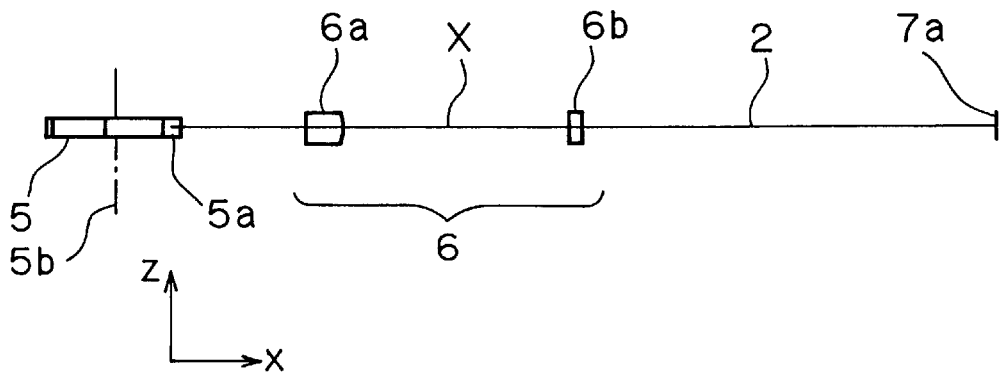

FIGS. 14A and 14B are diagrams showing the configuration of the scanning optical system in a fifth embodiment of the invention, with FIG. 14A showing a plan view and FIG. 14B showing a side view. As shown in these figures, the coordinate system used here is assumed to have an x axis along the optical axis X, a y axis along the main scanning direction, and a z axis along the sub scanning direction. Here, the laser beam 2 is incident on a reflecting surface 5a of the polygon mirror 5 from the direction indicated by an arrow A in FIG. 14A.

The coordinate system has its origin at the point where the reflecting surface 5a and the optical axis X intersect. In this embodiment, the scanning optical system has two scanning lenses 6a and 6b and a scanning mirror 6c. In FIGS. 14A and 14B, whereas the two scanning lenses 6a and 6b are illustrated, the scanning mirror 6c is omitted, and accordingly the optical path is illustrated as not bent thereby. Individual optical surfaces are identified with the following surface numbers: the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, and the image surface 7a on the photoconductive drum 7 with r5.

Table 16 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first and second scanning lenses 6a and 6b of the scanning optical system 6, and the image surface 7a of the photoconductive drum 7. All distances are given in mm.

In this scanning optical system, the first, second, and third surfaces are free-form surfaces, whose surface shape is defined by Formula (1) noted previously. Tables 17, 18, and 19 show, for the first, second, and third surfaces respectively, the actual values of the coefficient $a_{ij}$ in Formula (1) defining the surface shape, for various values of y of degree i and z of degree j, in the form of a matrix having i rows and j columns. In these tables En (where n is an integer number) represents ×10$^n$; for example E-03 represents ×10$^{-3}$.

Figure 15A:
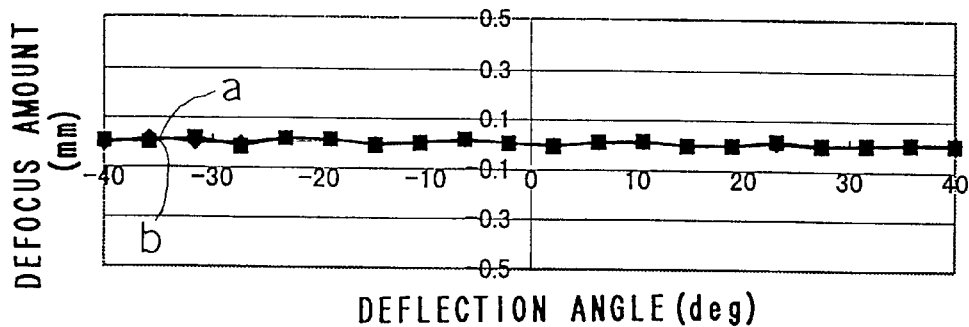
FIGS. 15A, 15B, 15C and 15D are diagrams showing the optical performance of the scanning optical system in the fifth embodiment.
Figure 15B:
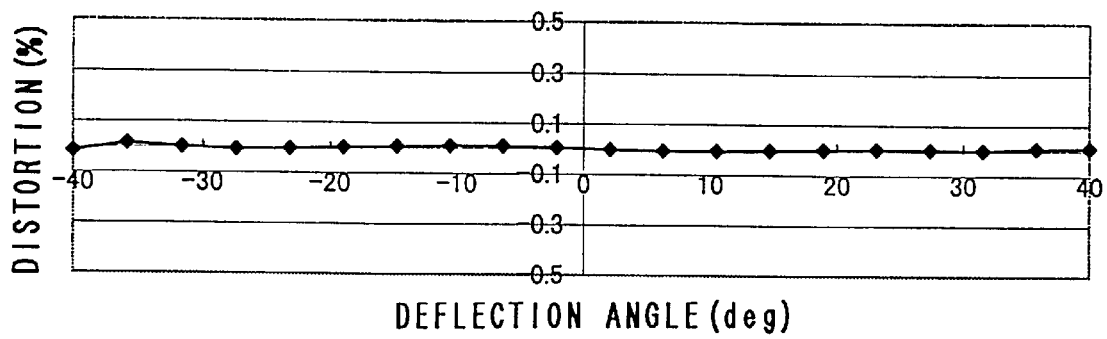
Figure 15C:
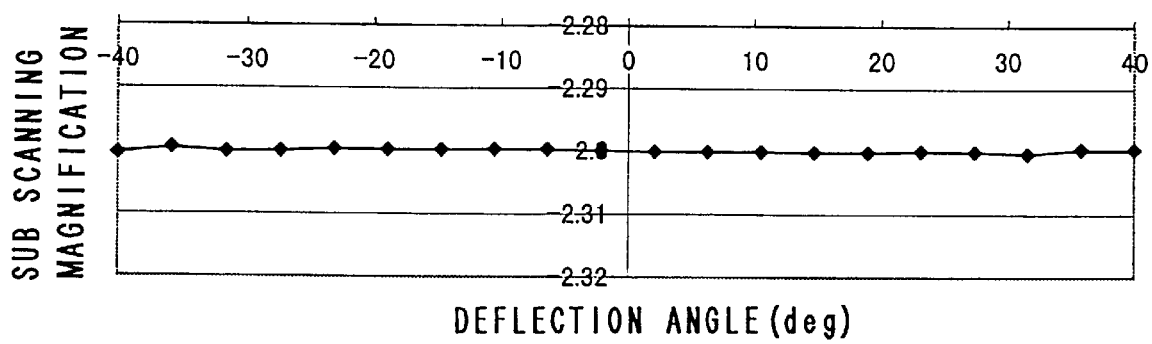
Figure 15D:
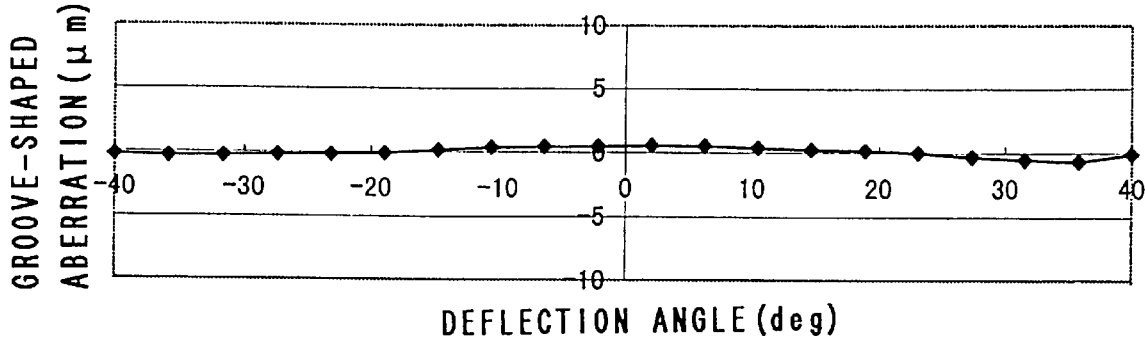

FIGS. 15A to 15D are diagrams showing the optical performance of the scanning optical system in this embodiment, with FIG. 15A showing curvature of field, FIG. 15B showing distortion, FIG. 15C showing magnification in the sub scanning direction, and FIG. 15D showing groove-shaped aberration. FIG. 15A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 15B shows distortion, with the deflection angle (°) taken along the horizontal axis and the degree of distortion (%) taken along the vertical axis. FIG. 15C shows magnification in the sub scanning direction, with the deflection angle (°) taken along the horizontal axis and the magnification in the sub scanning direction taken along the vertical axis. FIG. 15D shows groove-shaped distortion, with the deflection angle (°) taken along the horizontal axis and the amount of groove-shaped distortion (μm) taken along the vertical axis.

These figures show that various types of aberration are corrected properly in this embodiment. Here, as in the fourth embodiment, the scanning optical system has three free-form surfaces that are each so shaped that their radius of curvature as viewed on a sectional plane along the sub scanning direction varies independently of their shape in the main scanning direction.

Figure 16A:
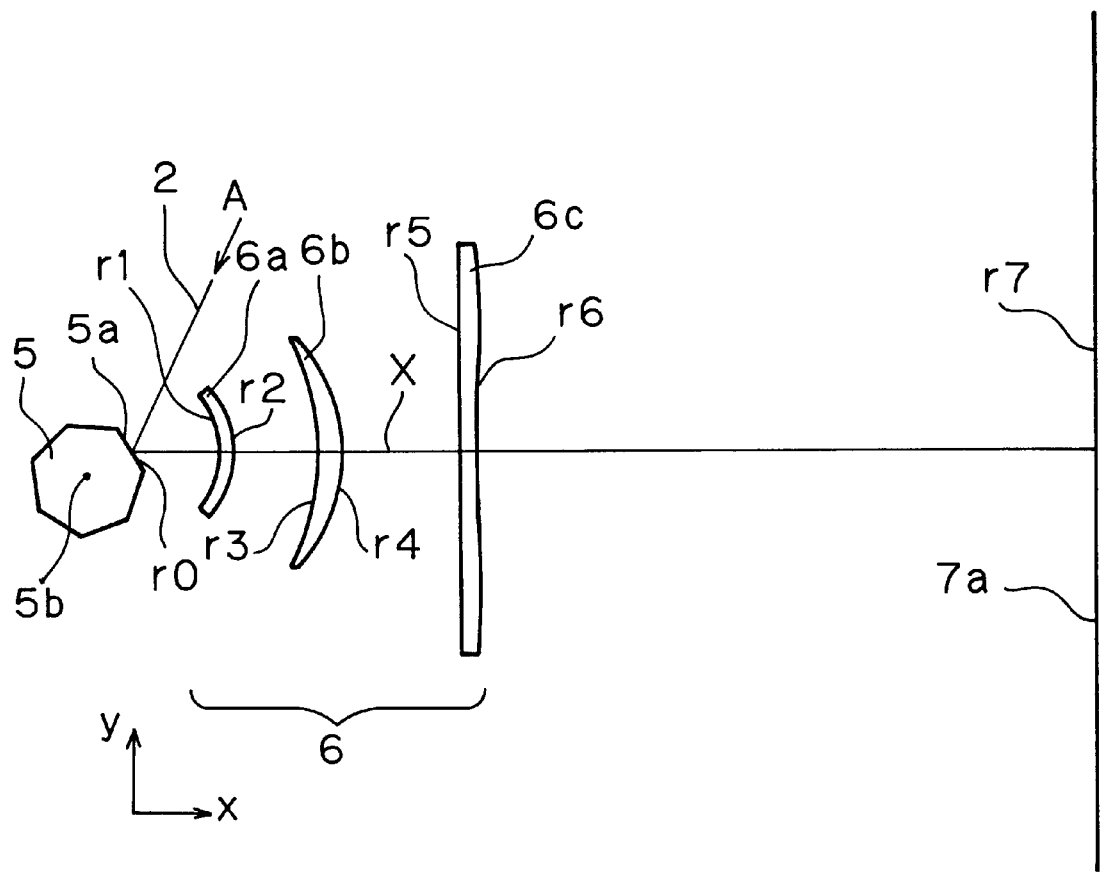
FIGS. 16A and 16B are diagrams showing the configuration of the scanning optical system in a sixth embodiment of the invention.
Figure 16B:
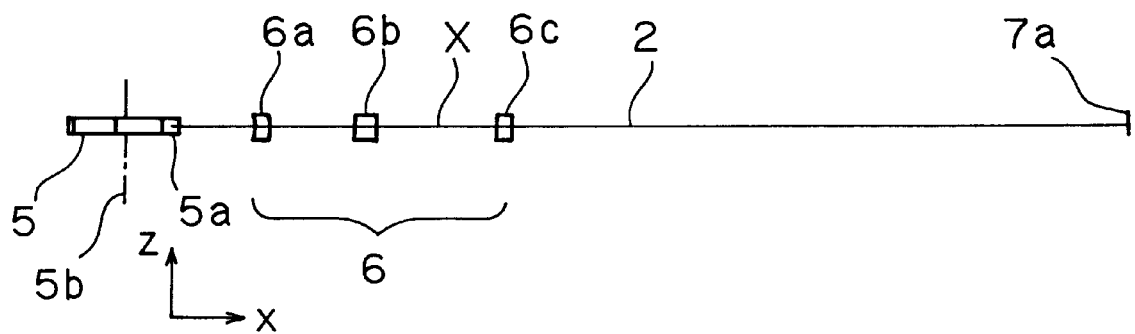

FIGS. 16A and 16B are diagrams showing the configuration of the scanning optical system in a sixth embodiment of the invention, with FIG. 16A showing a plan view and FIG. 16B showing a side view. As shown in these figures, the coordinate system used here is assumed to have an x axis along the optical axis X, a y axis along the main scanning direction, and a z axis along the sub scanning direction. Here, the laser beam 2 is incident on a reflecting surface 5a of the polygon mirror 5 from the direction indicated by an arrow A in FIG. 16A.

The coordinate system has its origin at the point where the reflecting surface 5a and the optical axis X intersect. In this embodiment, the scanning optical system has three scanning lenses 6a, 6b, and 6c and a scanning mirror 6d. In FIGS. 16A and 16B, whereas the three scanning lenses 6a, 6b, and 6c are illustrated, the scanning mirror 6d is omitted, and accordingly the optical path is illustrated as not bent thereby. Individual optical surfaces are identified with the following surface numbers: the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, the entrance-side surface of the third scanning lens 6c with r5, the exit-side surface of the same with r6, and the image surface 7a on the photoconductive drum 7 with r7.

Table 20 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first, second, and third scanning lenses 6a, 6b, and 6c of the scanning optical system 6, and the image surface 7a of the photoconductive drum 7. All distances are given in mm.

In this scanning optical system, the first, second, and sixth surfaces are free-form surfaces, whose surface shape is defined by Formula (1) noted previously. Tables 21, 22, and 23 show, for the first, second, and sixth surfaces respectively, the actual values of the coefficient $a_{ij}$ in Formula (1) defining the surface shape, for various values of y of degree i and z of degree j, in the form of a matrix having i rows and j columns. In these tables En (where n is an integer number) represents $\times 10^n$; for example E-03 represents $\times 10^{-3}$.

Figure 17A:
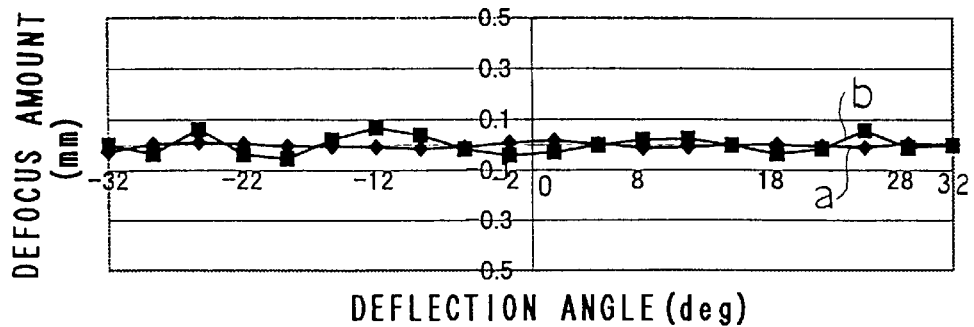
FIGS. 17A, 17B, 17C and 17D are diagrams showing the optical performance of the scanning optical system in the sixth embodiment.
Figure 17B:
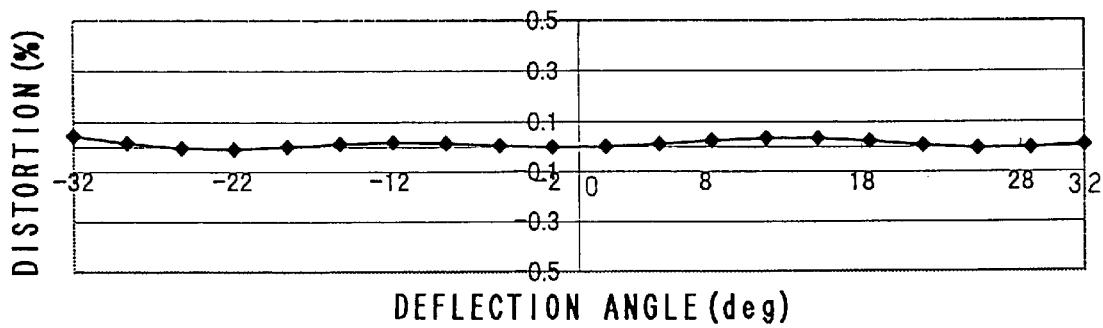
Figure 17C:
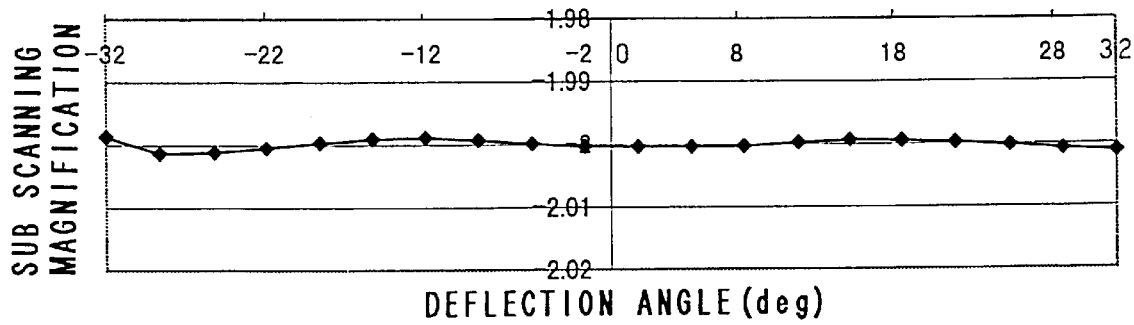
Figure 17D:
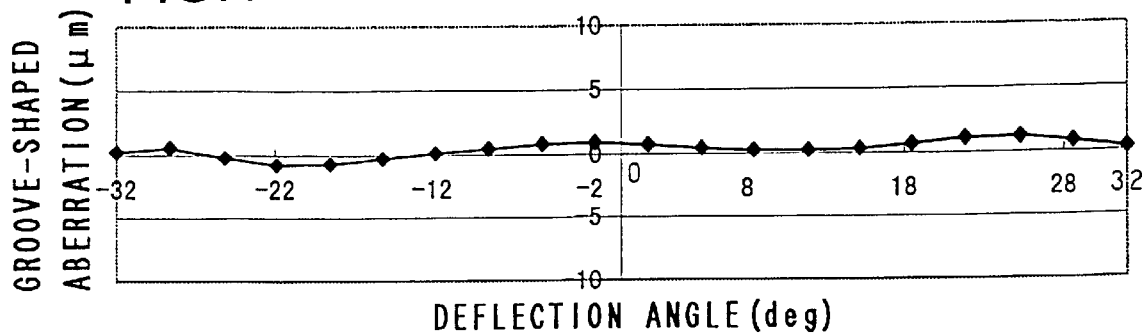

FIGS. 17A to 17D are diagrams showing the optical performance of the scanning optical system in this embodiment, with FIG. 17A showing curvature of field, FIG. 17B showing distortion, FIG. 17C showing magnification in the sub scanning direction, and FIG. 17D showing groove-shaped aberration. FIG. 17A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 17B shows distortion, with the deflection angle (°) taken along the horizontal axis and the degree of distortion (%) taken along the vertical axis. FIG. 17C shows magnification in the sub scanning direction, with the deflection angle (°) taken along the horizontal axis and the magnification in the sub scanning direction taken along the vertical axis. FIG. 17D shows groove-shaped distortion, with the deflection angle (°) taken along the horizontal axis and the amount of groove-shaped distortion (μm) taken along the vertical axis.

These figures show that various types of aberration are corrected properly in this embodiment. Here, as in the fourth embodiment, the scanning optical system has three free-form surfaces that are each so shaped that their radius of curvature as viewed on a sectional plane along the sub scanning direction varies independently of their shape in the main scanning direction. The configurations of the fourth to sixth embodiments offer three degrees of freedom in the sub scanning direction, and thus allow simultaneous correction of three types of aberration, namely curvature of field in the sub scanning direction, unevenness of magnification in sub scanning direction, and groove-shaped aberration.

Figure 18:
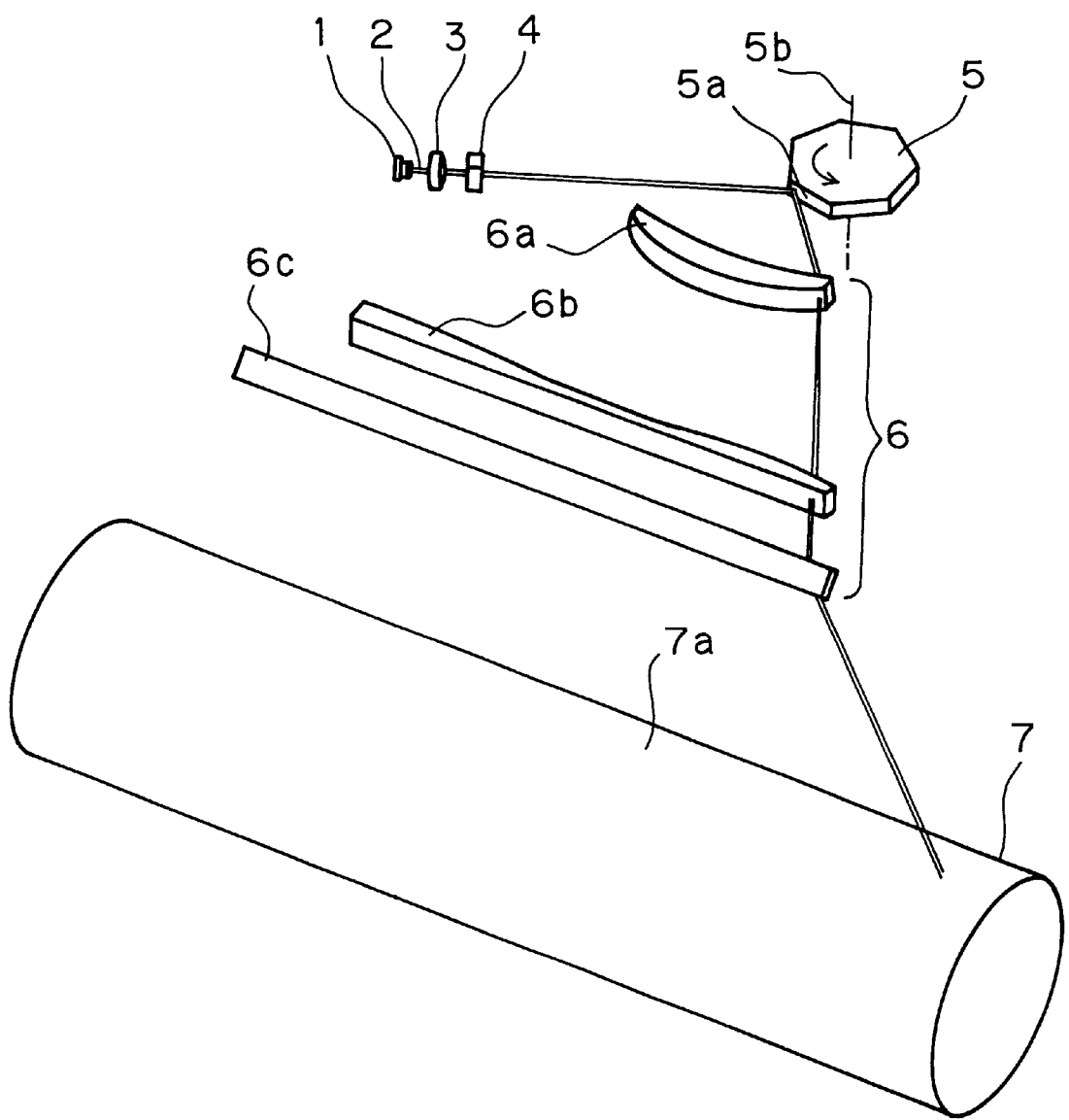
FIG. 18 is a perspective view showing an outline of the construction of a seventh embodiment of the invention.

FIG. 18 is a perspective view showing an outline of the construction of the laser scanning apparatus of a seventh embodiment of the invention. As shown in this figure, a laser beam 2 emitted from a laser source 1 is passed through a collimator lens 3 so as to be formed into a parallel beam, and is then passed through a cylindrical lens 4 so as to be focused, only in the sub scanning direction, in the vicinity of a reflecting surface 5a of a polygon mirror 5. The laser beam is then deflected by a polygon mirror 5 that rotates about a rotational axis 5b as indicated by an arrow, and is then refracted and reflected by a scanning optical system 6 in such a way as to be focused on an image surface 7a on a cylindrical photoconductive drum 7, forming a latent image thereon. As the polygon mirror 5 rotates, the individual reflecting surfaces sa thereof rotate, and this permits the laser beam 2 to scan the image surface 7a on the rotating photoconductive drum 7 and thereby form the latent image thereon.

The scanning optical system 6 is composed of, in the order in which the laser beam passes through, a first scanning lens 6a, a second scanning lens 6b, and a scanning mirror 6c. Here, the laser source 1 is an array laser that emits a plurality of laser beams. The collimator lens 3 and the cylindrical lens 4 are so designed that, when the plurality of laser beams emitted from the array laser are focused in the sub scanning direction in the vicinity of the reflecting surface of the polygon mirror 5, those beams are focused on spots a predetermined interval apart from one another in the sub scanning direction. This interval depends on the intervals between scanning lines along which image formation progresses and the optical magnification in the sub scanning direction. It is to be noted that, basically, the construction described above is common to both of the seventh and eighth embodiments of the present invention described below.

Figure 19A:
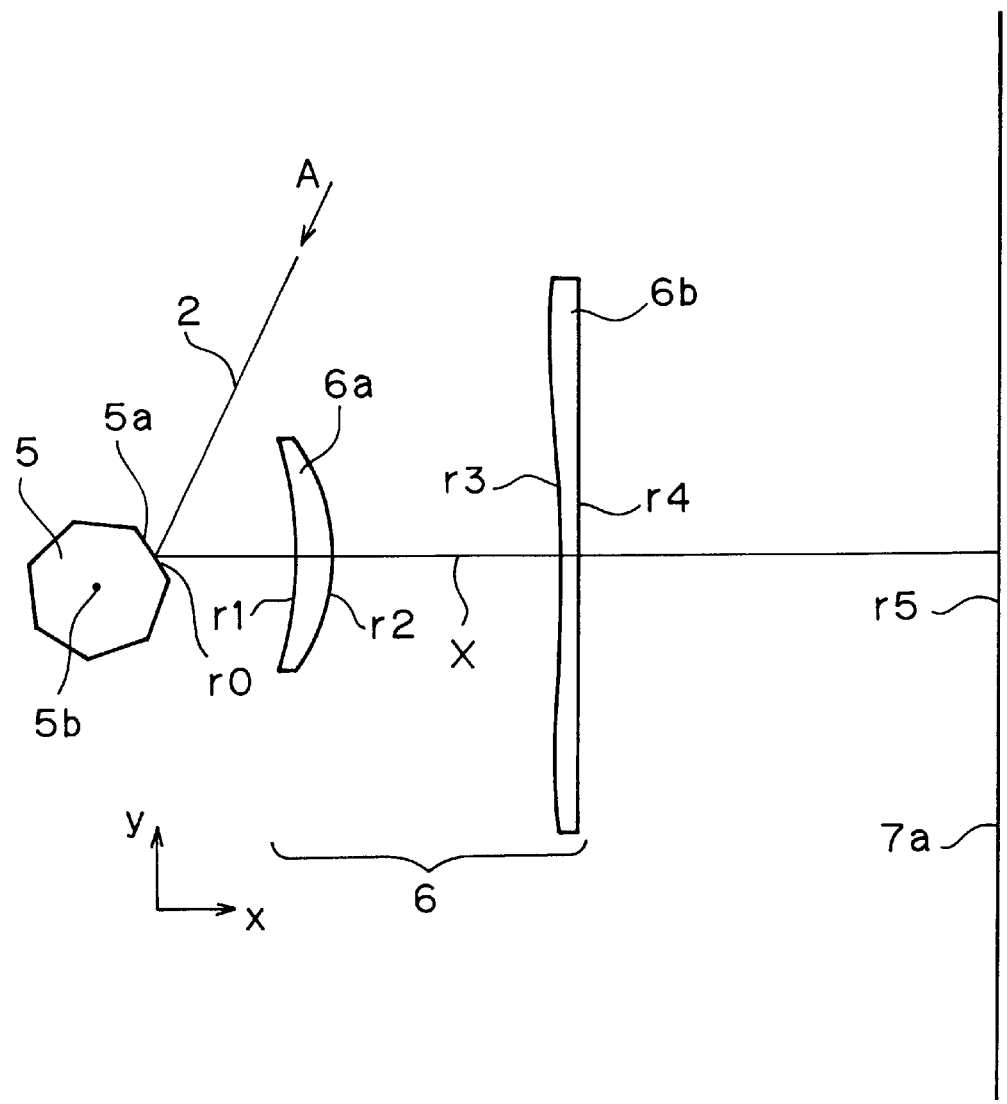
FIGS. 19A and 19B are diagrams showing the configuration of the scanning optical system in the seventh embodiment.
Figure 19B:
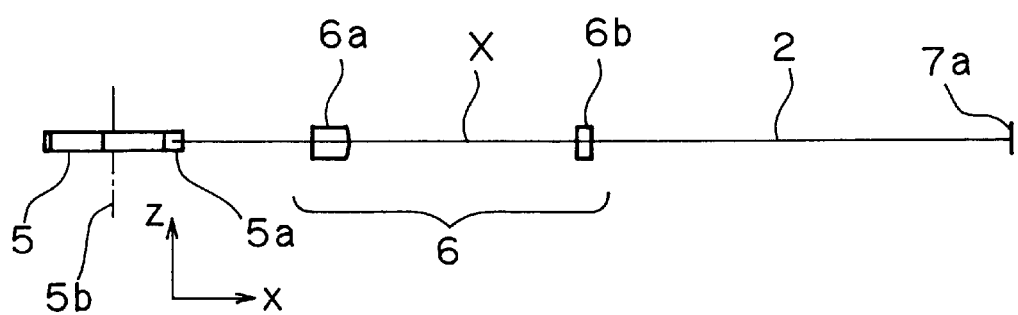

FIGS. 19A and 19B are diagrams showing the configuration of the scanning optical system in the seventh embodiment of the invention, with FIG. 19A showing a plan view and FIG. 19B showing a side view. As shown in these figures, the coordinate system used here is assumed to have an x axis along the optical axis X (the optical axis of the light reflected from the polygon mirror 5 at a deflection angle of 0°; this applies throughout the following descriptions), a y axis along the main scanning direction, and a z axis along the sub scanning direction. Here, the laser beam 2 is incident on a reflecting surface 5a of the polygon mirror 5 from the direction indicated by an arrow A in FIG. 19A.

The coordinate system has its origin at the point where the reflecting surface 5a and the optical axis X intersect. In FIGS. 19A and 19B, the scanning mirror 6c is omitted, and accordingly the optical path is illustrated as not bent thereby. Individual optical surfaces are identified with the following surface numbers: the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, and the image surface 7a on the photoconductive drum 7 with r5.

Table 24 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first and second scanning lenses 6a and 6b of the scanning optical system 6, and the image surface 7a of the photoconductive drum 7. All distances are given in mm.

In this scanning optical system, the second and third surfaces are free-form surfaces, whose surface shape is defined by $$x = \sum_{i=0}^{10} \sum_{j=0}^{3} a_{ij} y^i z^j \qquad (2)$$

Here, as described above, the coordinate system is assumed to have an x axis along the optical axis, a y axis along the main scanning direction, and a z axis along the sub scanning direction. In Formula (2) noted above, the terms with z of degree 0 represent the surface shape in the main scanning direction. The surface shape as viewed on a sectional plane along the sub scanning direction is parabolic, and the terms with z of degree 2 represent the curvature of the parabola at or near the vertex thereof. The terms with z of degree 1 are basically all equal to 0. Accordingly, the vertex of the parabola as viewed on a sectional plane along the sub scanning direction lies on the x-y plane irrespective of its position in the main scanning direction.

Tables 25 and 26 show, for the second and third surfaces respectively, the actual values of the coefficient $a_{ij}$ in Formula (2) defining the surface shape, for various values of y of degree i and z of degree j, in the form of a matrix having i rows and j columns. In these tables En (where n is an integer number) represents $\times 10^n$; for example E-03 represents $\times 10^{-3}$.

Figure 20A:
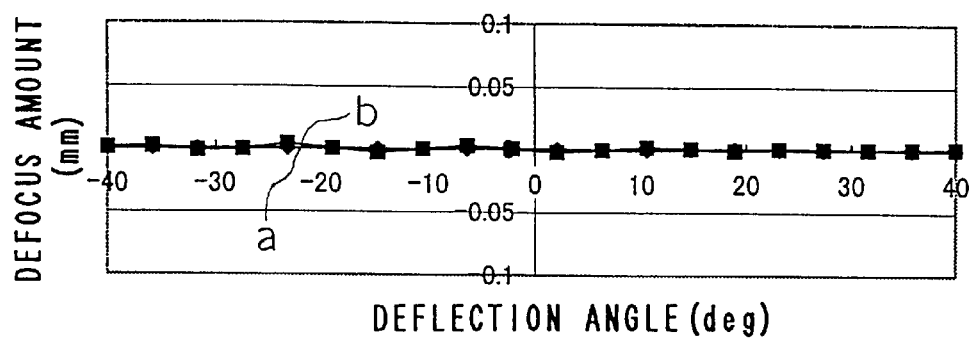
FIGS. 20A, 20B, and 20C are diagrams showing the optical performance of the scanning optical system in the seventh embodiment.
Figure 20B:
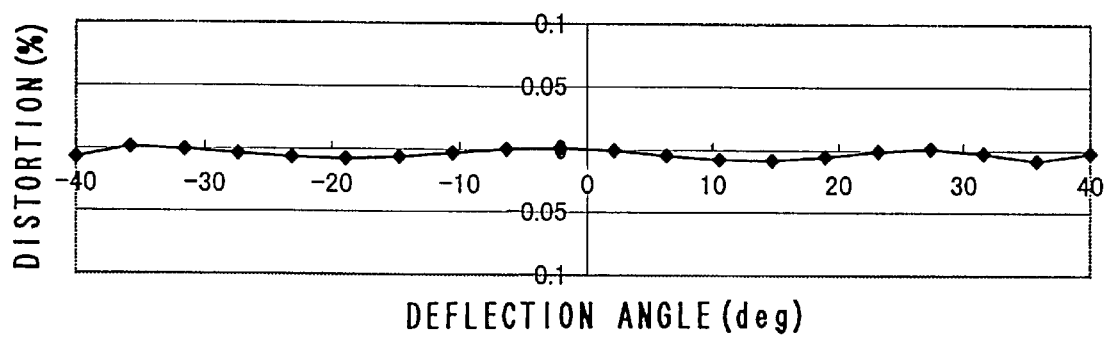
Figure 20C:
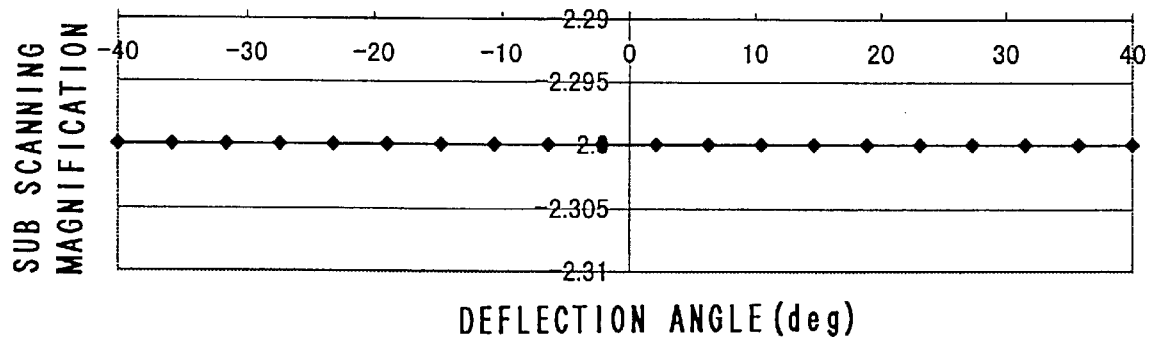

FIGS. 20A to 20C are diagrams showing the optical performance of the scanning optical system in this embodiment, with FIG. 20A showing curvature of field, FIG. 20B showing distortion, and FIG. 20C showing magnification in the sub scanning direction. FIG. 20A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 20B shows distortion, with the deflection angle (°) taken along the horizontal axis and the degree of distortion (%) taken along the vertical axis. FIG. 20C shows magnification in the sub scanning direction, with the deflection angle (°) taken along the horizontal axis and the magnification in the sub scanning direction taken along the vertical axis. These figures show that various types of aberration are corrected properly in this embodiment. Here, the scanning optical system has two free-form surfaces that are each so shaped that their radius of curvature as viewed on a sectional plane along the sub scanning direction varies independently of their shape in the main scanning direction and laterally asymmetrically. In addition, these two surfaces are formed on separate optical components (here, scanning lenses).

Figure 21A:
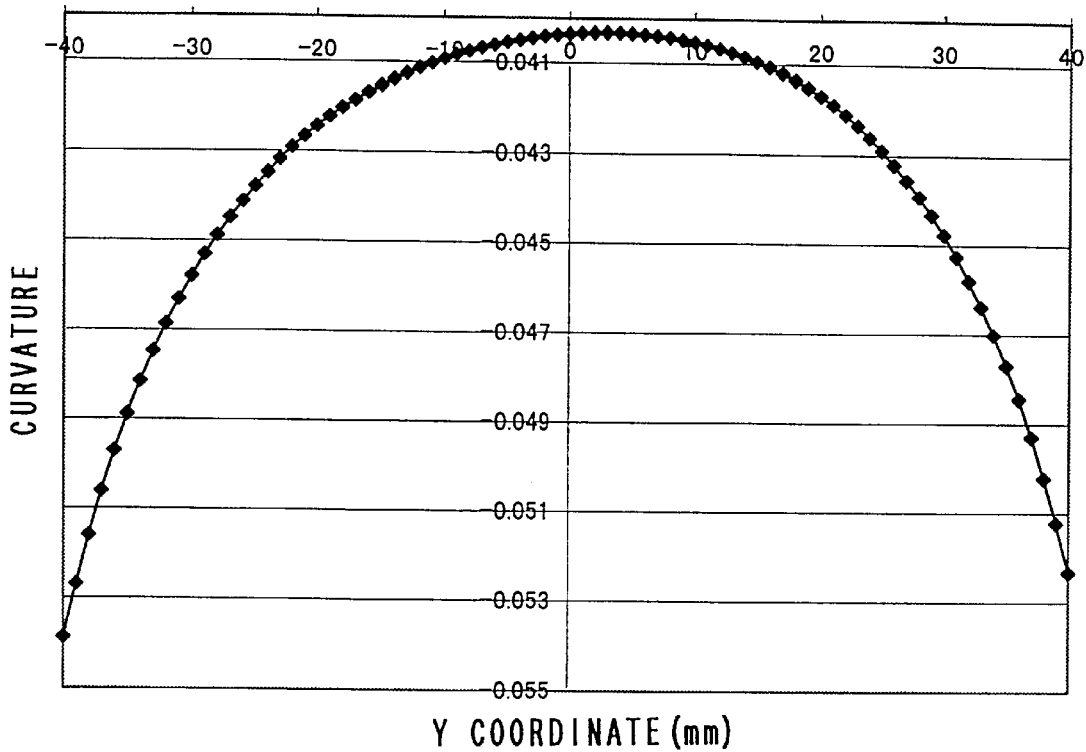
FIGS. 21A and 21B are diagrams showing the curvatures of some surfaces in the scanning optical system as viewed on a sectional plane along the sub scanning direction in the seventh embodiment.
Figure 21B:
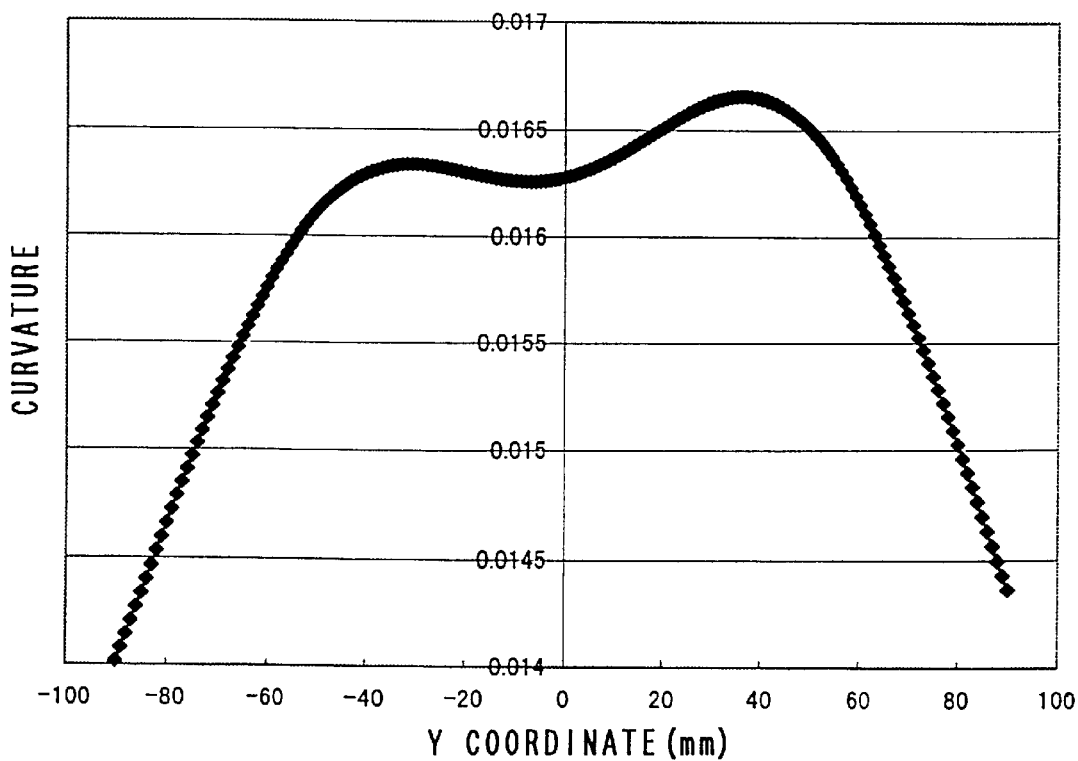

FIGS. 21A and 21B are diagrams showing the curvatures of some surfaces of the scanning optical system as viewed on a sectional plane along the sub scanning direction in the seventh embodiment, with FIG. 21A showing the curvature of the second surface and FIG. 21B showing the curvature of the third surface. In these figures, the y-axis coordinate (mm) is taken along the horizontal axis, and the curvature is taken along the vertical axis. As described above, these surfaces have a parabolic shape when viewed on a plane along the sub scanning direction, and the figures show their curvatures in the vicinity of z=0. As will be understood from the figures, the curvatures of those surfaces are each laterally asymmetrical, and each have a slope at y=0, i.e. on or near the optical axis.

FIGS. 22A, 22B, 22C, and 22D are diagrams showing the optical performance of examples given for comparison with this embodiment. These graphs show the curvature of field in the sub scanning direction as observed in various arrangements obtained by redesigning the scanning optical system of this embodiment by giving it different degrees of freedom in the surface shapes in the sub scanning direction while keeping the surface shapes in the main scanning direction the same. In redesigning here, only curvature of field in the sub scanning direction and unevenness of magnification in the sub scanning direction are given weight in the same proportion as in this embodiment. Accordingly, an arrangement that performs poorly in terms of curvature of field in the sub scanning direction performs poorly also in terms of unevenness of magnification in the sub scanning direction.

Figure 22A:
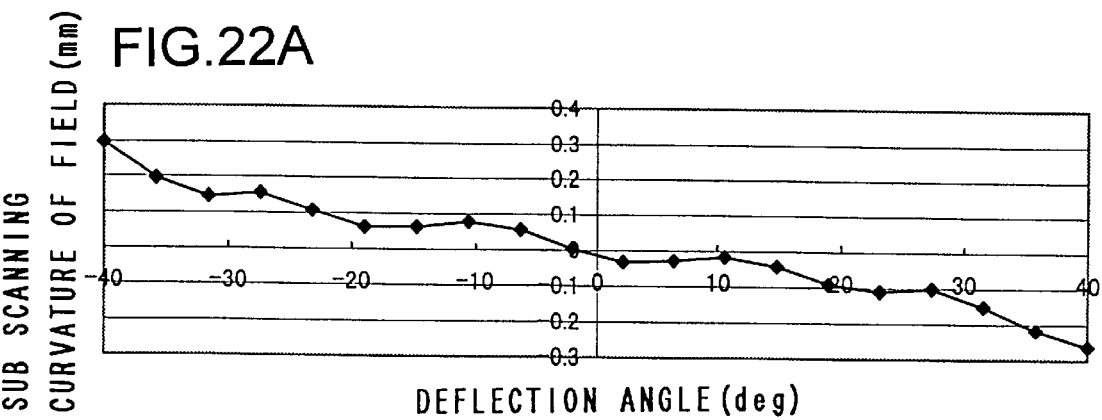
FIGS. 22A, 22B, 22C, and 22D are diagrams showing the optical performance of examples given for comparison with the seventh embodiment.
Figure 22B:
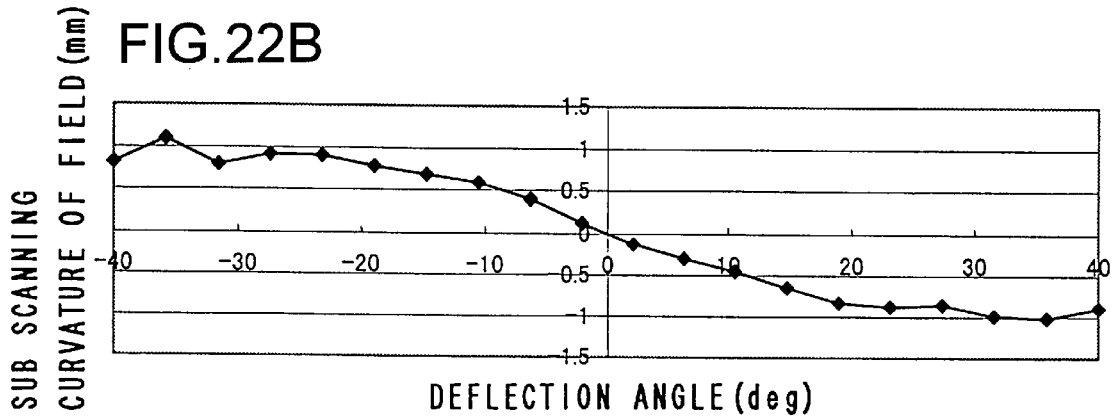

FIG. 22A shows the curvature of field observed when the lateral asymmetry of the second surface in the sub scanning direction is eliminated. This graph shows the curvature of field varying from positive to negative as the graph runs from left to right. FIG. 22B shows the curvature of field observed when the lateral asymmetry of the second and third surfaces in the sub scanning direction is eliminated. This graph shows the curvature of field varying more steeply from positive to negative as the graph runs from left to right. Incidentally, lateral asymmetry can be eliminated by setting, in Formula (2) noted previously, all the coefficients having z of degree 2 and y of any odd-numbered degree. Comparing these results with that shown in FIG. 20A makes clear the effect of giving two surfaces lateral asymmetry.

Figure 22C:
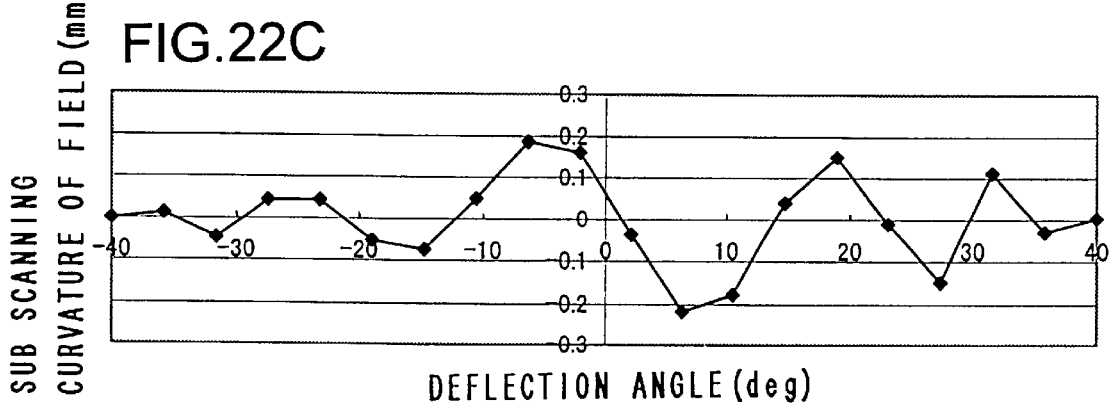

FIG. 22C shows the curvature of field observed when the slope of the curvature of the second and third surfaces as viewed near the optical axis on a sectional plane along the sub scanning direction is eliminated. This graph shows the curvature of field varying greatly between positive and negative regions over the entire range of deflection angles, particularly greatly around a deflection angle of 0°. Incidentally, a slope near the optical axis can be eliminated by setting, in Formula (2) noted previously, all the coefficients having z of degree 2 and y of degree 1. Comparing this result with that shown in FIG. 20A makes clear the effect of giving the curvatures of surfaces a slope near the optical axis.

Figure 22D:
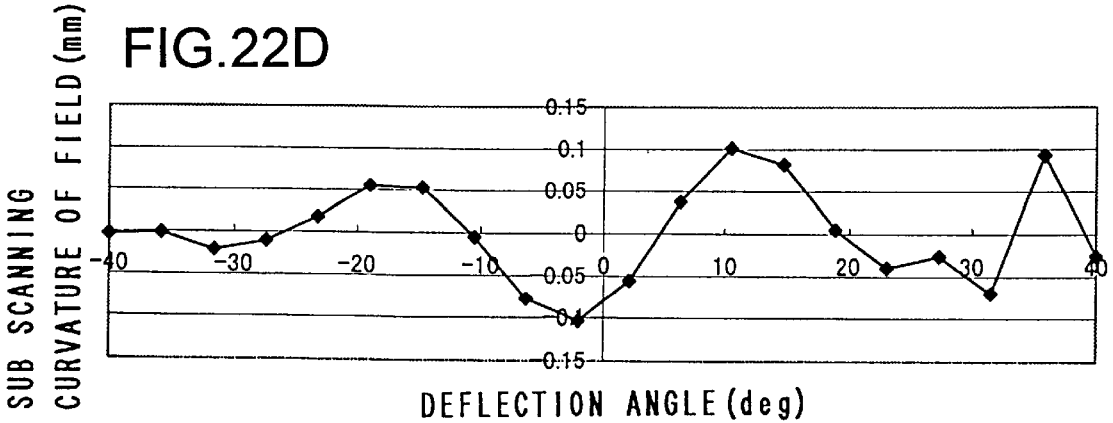

FIG. 22D shows the curvature of field observed when the surface shape of the second surface as viewed on a sectional plane along the sub scanning direction is made linear and instead freedom is secured in the surface shape of the fourth surface as viewed on a sectional plane along the sub scanning direction. That is, freedom in surface shape is secured on both surfaces of the second scanning lens 6b. Also this graph shows the curvature of field varying greatly between positive and negative regions over the entire range of deflection angles. Comparing this result with that shown in FIG. 20A makes it clear that securing freedom in surface shape on separate lenses is more advantageous than securing freedom in surface shape on both surfaces of a single lens.

Figure 23A:
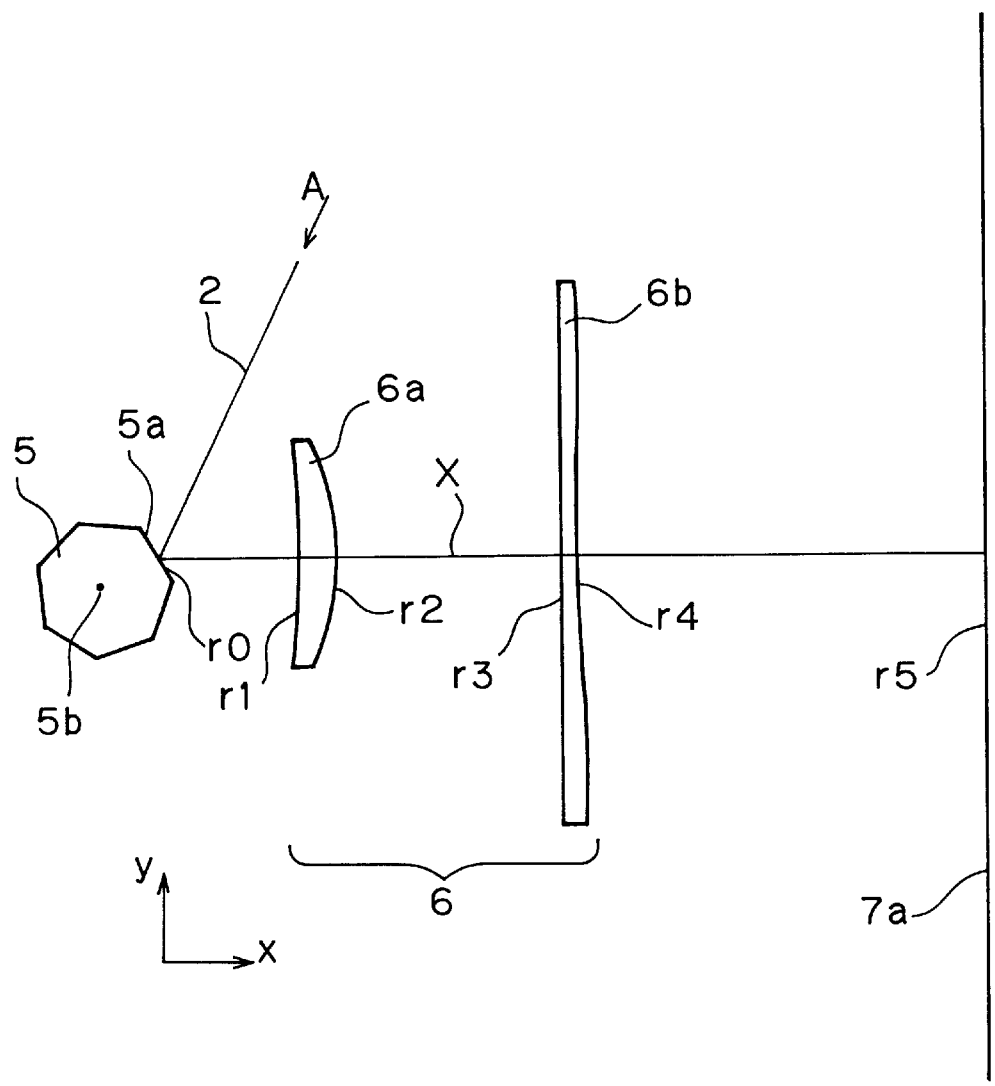
FIGS. 23A and 23B are diagrams showing the configuration of the scanning optical system in an eighth embodiment of the invention.
Figure 23B:
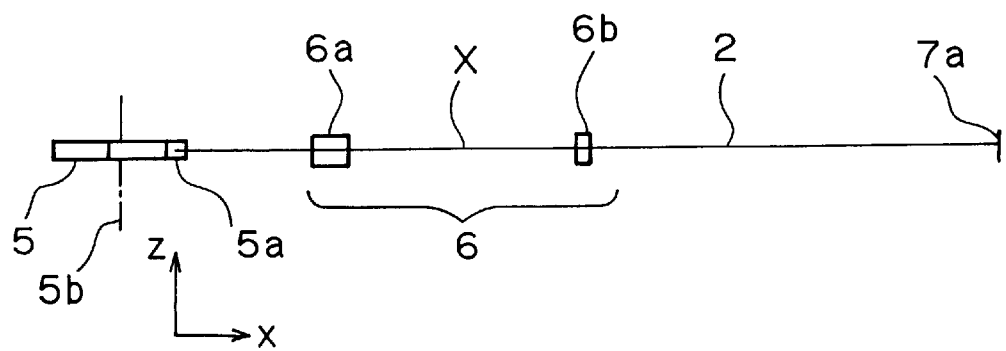

FIGS. 23A and 23B are diagrams showing the configuration of the scanning optical system in an eighth embodiment of the invention, with FIG. 23A showing a plan view and FIG. 23B showing a side view. As shown in these figures, the coordinate system used here is assumed to have an x axis along the optical axis X, a y axis along the main scanning direction, and a z axis along the sub scanning direction. Here, the laser beam 2 is incident on a reflecting surface 5a of the polygon mirror 5 from the direction indicated by an arrow A in FIG. 23A.

The coordinate system has its origin at the point where the reflecting surface 5a and the optical axis X intersect. In FIGS. 23A and 23B, the scanning mirror 6c is omitted, and accordingly the optical path is illustrated as not bent thereby. Individual optical surfaces are identified with the following surface numbers; the reflecting surface 5a of the polygon mirror 5 is identified with the surface number r0, the entrance-side surface of the first scanning lens 6a with r1, the exit-side surface of the same with r2, the entrance-side surface of the second scanning lens 6b with r3, the exit-side surface of the same with r4, and the image surface 7a on the photoconductive drum 7 with r5.

Table 27 shows the construction data of this scanning optical system, listing the curvatures, axial distances along the optical axis X, and refractive indices of the individual surfaces that are identified with the above-mentioned surface numbers, namely the reflecting surface 5a of the polygon mirror 5, the surfaces of the first and second scanning lenses 6a and 6b of the scanning optical system 6, and the image surface 7a of the photoconductive drum 7. All distances are given in mm.

In this scanning optical system, the second and fourth surfaces are free-form surfaces, whose surface shape is defined by Formula (2) noted previously. Tables 28 and 29 show, for the second and fourth surfaces respectively, the actual values of the coefficient $a_{ij}$ in Formula (2) defining the surface shape, for various values of y of degree i and z of degree j, in the form of a matrix having i rows and j columns. In these tables En (where n is an integer number) represents $\times 10^n$; for example E-03 represents $\times 10^{-3}$.

Figure 24A:
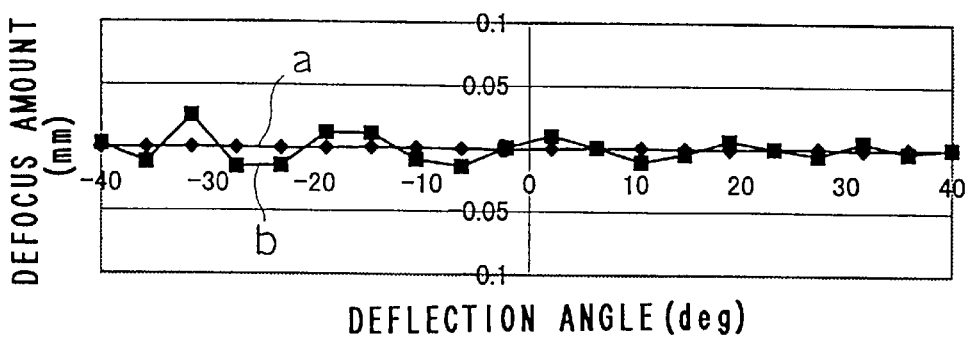
FIGS. 24A, 24B, and 24C are diagrams showing the optical performance of the scanning optical system in the eighth embodiment.
Figure 24B:
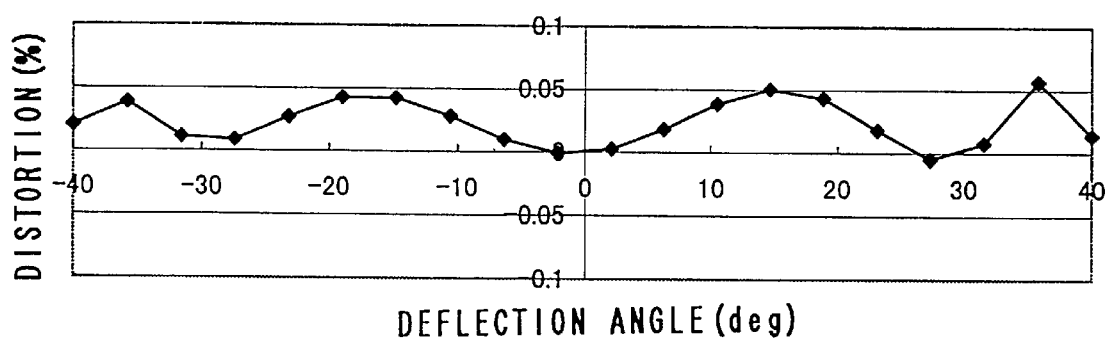
Figure 24C:
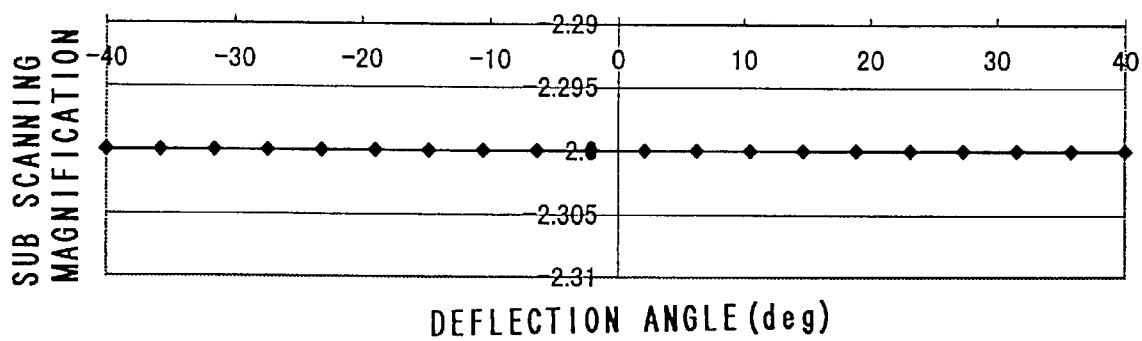

FIGS. 24A to 24C are diagrams showing the optical performance of the scanning optical system in this embodiment, with FIG. 24A showing curvature of field, FIG. 24B showing distortion, and FIG. 24C showing magnification in the sub scanning direction. FIG. 24A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 24B shows distortion, with the deflection angle (°) taken along the horizontal axis and the degree of distortion (%) taken along the vertical axis. FIG. 24C shows magnification in the sub scanning direction, with the deflection angle (°) taken along the horizontal axis and the magnification in the sub scanning direction taken along the vertical axis. These figures show that various types of aberration are corrected properly in this embodiment. Here, as in the seventh embodiment, the scanning optical system has two free-form surfaces that are each so shaped that their radius of curvature as viewed on a sectional plane along the sub scanning direction varies independently of their shape in the main scanning direction and laterally asymmetrically. In addition, these two surfaces are formed on separate optical components (here, scanning lenses).

Figure 25:
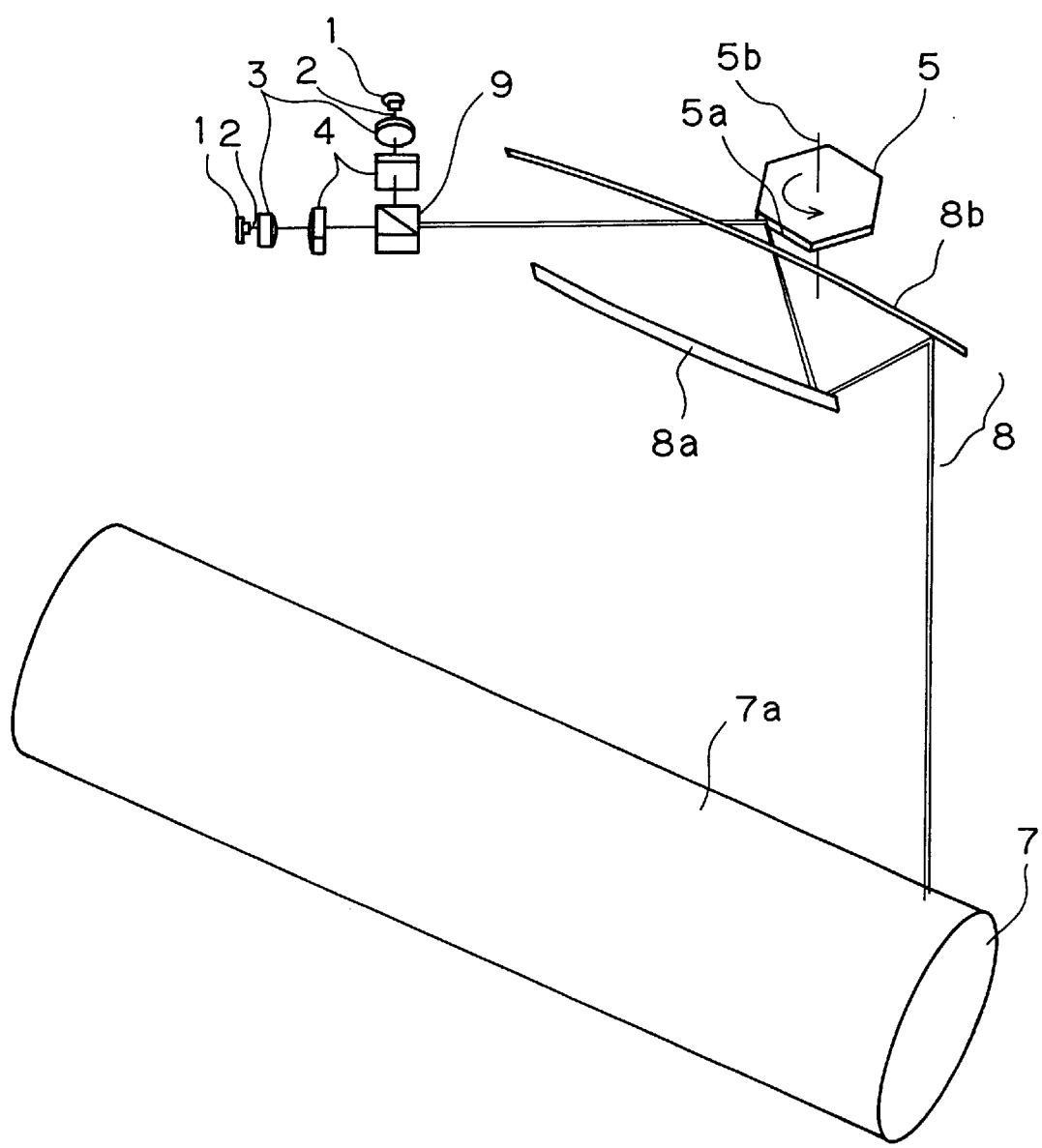
FIG. 25 is a perspective view showing an outline of the construction of a ninth embodiment of the invention.

FIG. 25 is a perspective view showing an outline of the construction of the laser scanning apparatus of a ninth embodiment of the invention. As shown in this figure, in this embodiment, a plurality of laser sources 1, a plurality of collimator lenses 3, and a plurality of cylindrical lenses 4 are provided. The laser beams 2 emitted individually from the laser sources 1 are passed through the corresponding collimator lenses 3 so as to be formed into parallel beams, are then passed through the corresponding cylindrical lenses 4, are then integrated together by an integrator 9, such as a beam splitter, so as to be directed to a polygon mirror 5, and are then focused, only in the sub scanning direction, in the vicinity of a reflecting surface 5a of the polygon mirror 5.

The laser beams are then deflected by a polygon mirror 5 that rotates about a rotational axis 5b as indicated by an arrow, and are then reflected by a first mirror 8a and a second mirror 8b of a scanning mirror 8 in such a way as to be focused on an image surface 7a on a cylindrical photoconductive drum 7, forming a latent image thereon. As the polygon mirror 5 rotates, the individual reflecting surfaces 5a thereof rotate, and this permits the laser beams 2 to scan the image surface 7a on the rotating photoconductive drum 7 and thereby form the latent image thereon.

Figure 26A:
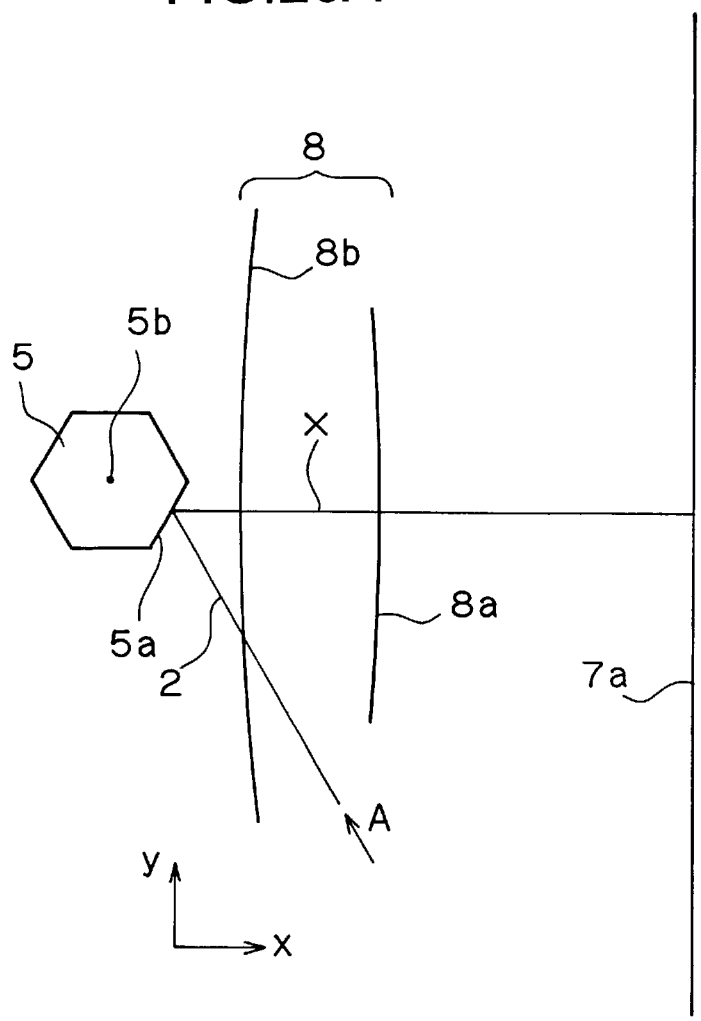
FIGS. 26A and 26B are diagrams showing the configuration of the scanning optical system in the ninth embodiment.
Figure 26B:
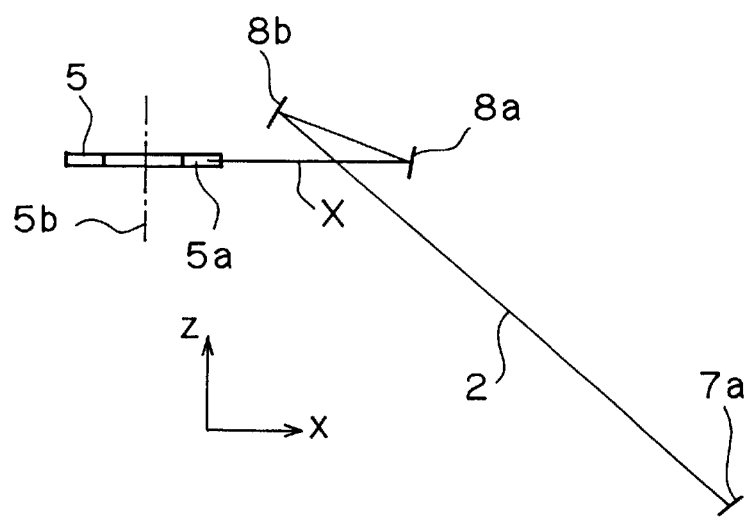

FIGS. 26A and 26B are diagrams showing the configuration of the scanning optical system in the ninth embodiment of the invention, with FIG. 26A showing a plan view and FIG. 26B showing a side view. As shown in these figures, the coordinate system used here is assumed to have an x axis along the optical axis X, a y axis along the main scanning direction, and a z axis along the sub scanning direction. Here, the laser beam 2 is incident on a reflecting surface 5a of the polygon mirror 5 from the direction indicated by an arrow A in FIG. 26A. The coordinate system has its origin at the point where the reflecting surface 5a and the optical axis X intersect. Table 30 shows the surface coordinates of the individual surfaces of this scanning optical system. In this table, the position and orientation of the surfaces of the first and second mirrors 8a and 8b and the image surface 7a (evaluation surface) on the photoconductive drum 7 are represented by the origin, the x-axis vector, and the y-axis vector of their respective local coordinate systems. All distances are given in mm.

Tables 31 and 32 show, for the mirror surfaces of the first and second mirrors 8a and 8b respectively, the actual values of the coefficient all in Formula (2) noted previously as defining the surface shape, for various values of y of degree i and z of degree j, in the form of a matrix having i rows and j columns. In these tables En (where n is an integer number) represents $\times 10^n$; for example E-04 represents $\times 10^{-4}$. In the scanning optical system of this embodiment, to correct the z asymmetry that accompanies the separation of optical paths, only terms having z of degree 1 or 3 are used.

Figure 27A:
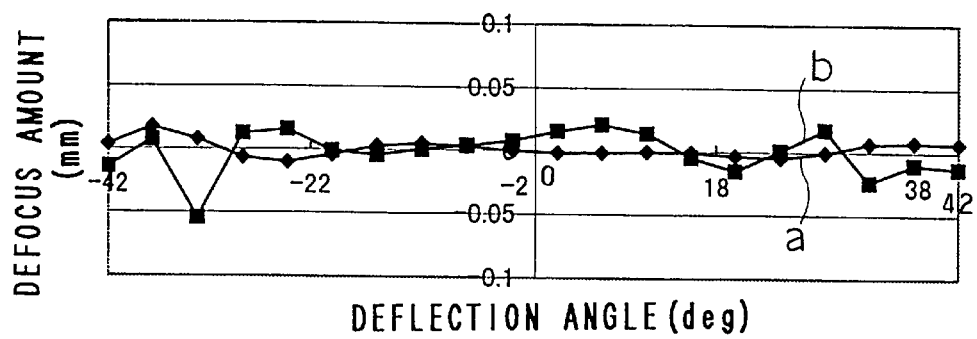
FIGS. 27A, 27B, and 27C are diagrams showing the optical performance of the scanning optical system in the ninth embodiment.
Figure 27B:
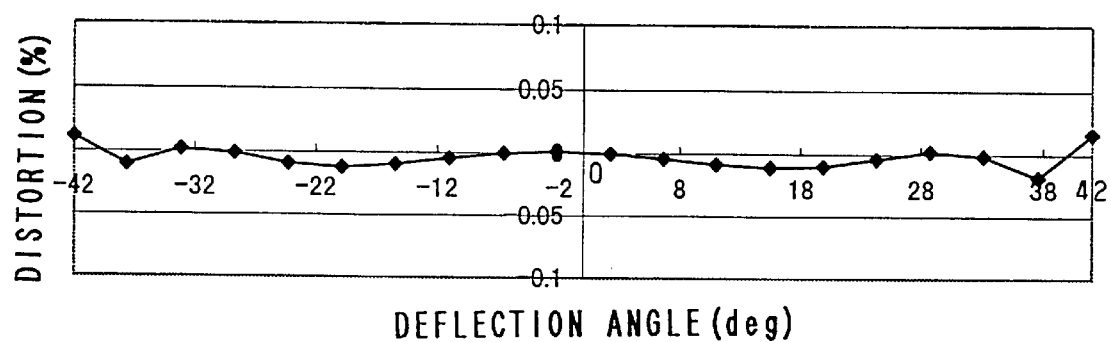
Figure 27C:
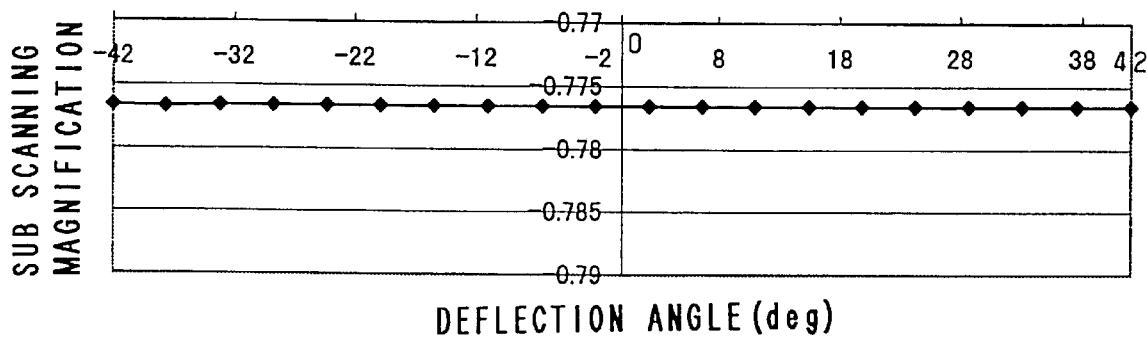

FIGS. 27A to 27C are diagrams showing the optical performance of the scanning optical system in this embodiment, with FIG. 27A showing curvature of field, FIG. 27B showing distortion, and FIG. 27C showing magnification in the sub scanning direction. FIG. 27A shows curvature of field in the main and sub scanning directions, with the deflection angle (°) taken along the horizontal axis and the defocus amount (mm) taken along the vertical axis. Here, the curvature of field in the sub scanning direction is indicated by a solid line "a", and the curvature of field in the main scanning direction is indicated by a solid line "b".

FIG. 27B shows distortion, with the deflection angle (°) taken along the horizontal axis and the degree of distortion (%) taken along the vertical axis. FIG. 27C shows magnification in the sub scanning direction, with the deflection angle (°) taken along the horizontal axis and the magnification in the sub scanning direction taken along the vertical axis. These figures show that various types of aberration are corrected properly in this embodiment. Here, as in the seventh embodiment, the scanning optical system has two free-form surfaces that are each so shaped that their radius of curvature as viewed on a sectional plane along the sub scanning direction varies independently of their shape in the main scanning direction and laterally asymmetrically. In addition, these two surfaces are formed on separate optical components (here, scanning lenses).

The configurations of the seventh to ninth embodiments described above offer two degrees of freedom in terms of lateral asymmetry in the sub scanning direction. This makes it possible to correct lateral asymmetry simultaneously with respect to curvature of field in the sub scanning direction and unevenness of magnification in the sub scanning direction.

In any of the embodiments described heretofore, when the scanning optical system is composed of scanning lenses, and in particular when multiple beams are involved, it is necessary to take care, in designing, to avoid unwanted color separation resulting from lateral chromatic aberration. When the scanning optical system is composed of scanning mirrors, no such care needs to be taken. However, using scanning mirrors tends to result in too high an optical power, and thus often makes the designing of the optical system difficult. By contrast, using scanning lenses permits the power of one surface of a lens to be canceled with the power of the other surface thereof to a certain degree, and thus allows a higher degree of freedom in designing.

Figure 28:
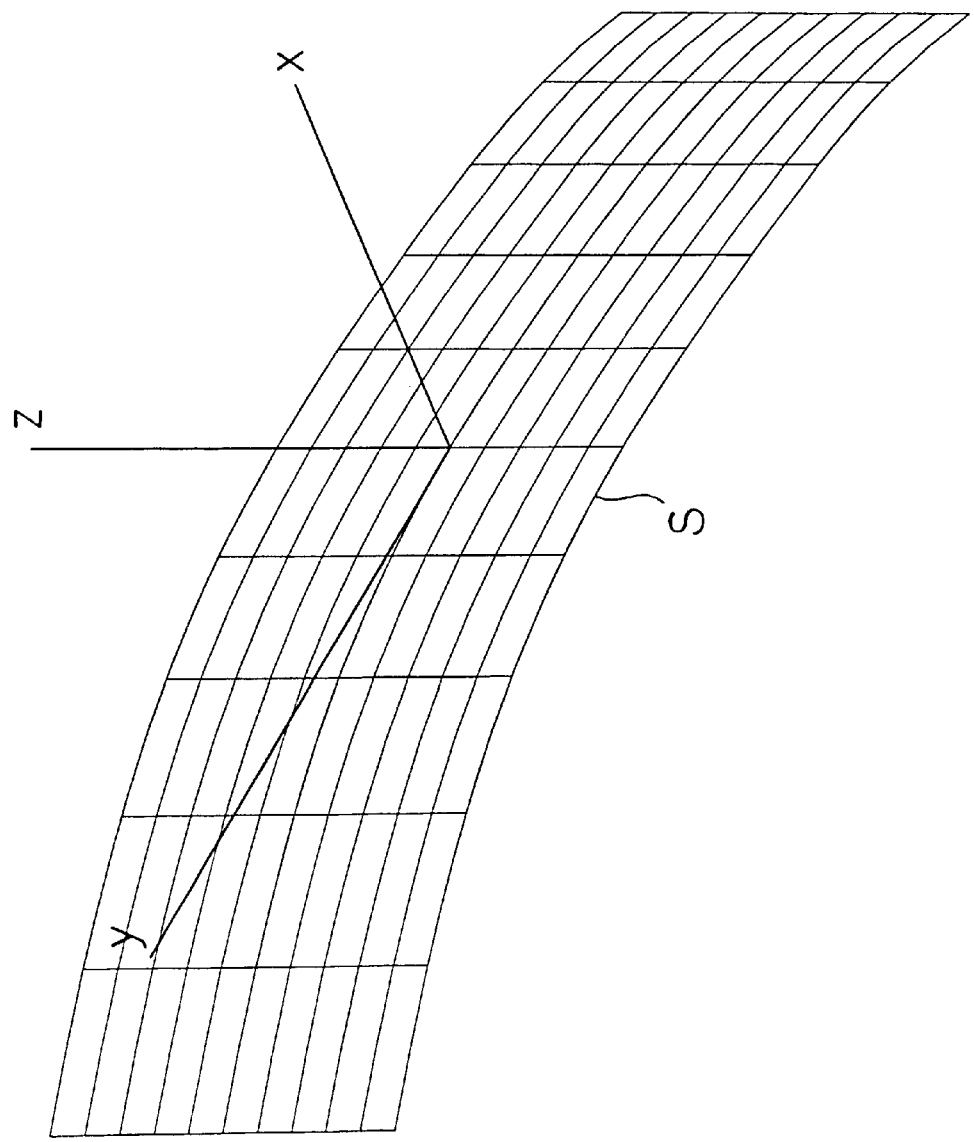
FIG. 28 is a perspective view schematically showing an example of the shape of a mirror or lens surface of the scanning optical system (with z of degree 0)

FIGS. 28 to 32 are perspective views schematically showing examples of the shape of a lens or mirror surface of the scanning optical system. In each of these figures, the shape of a mirror or lens surface S as defined by Formula (1) noted previously is illustrated in the form of a wire frame. FIG. 28 shows the shape of a surface having z of degree 0. Here, the surface is so shaped that a section thereof parallel to the xz plane is a line parallel to the z axis and that this line, as it moves along the y axis, moves along the x axis.

Figure 29:
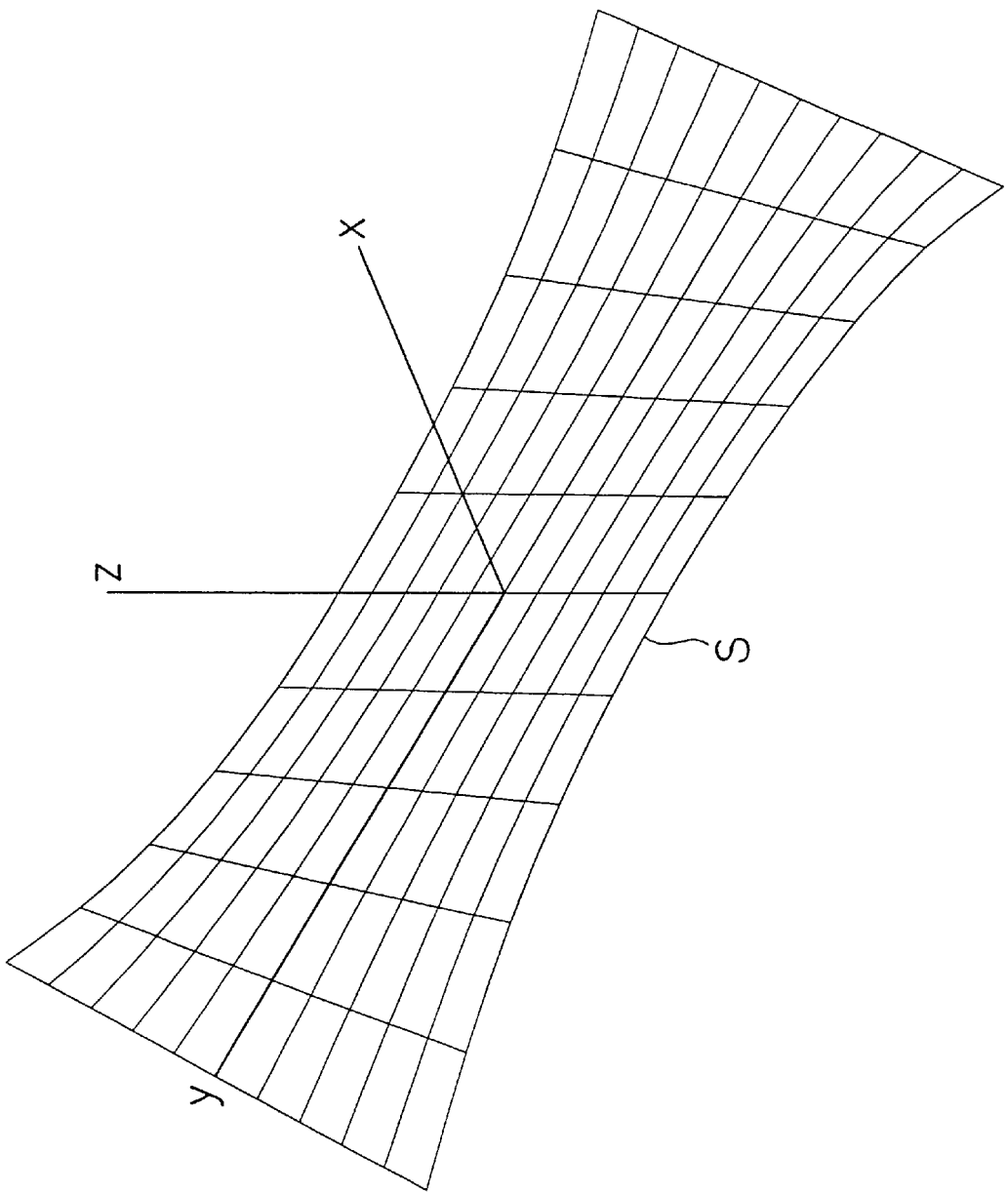
FIG. 29 is a perspective view schematically showing an example of the shape of a mirror or lens surface of the scanning optical system (with z of degree 1)
Figure 30:
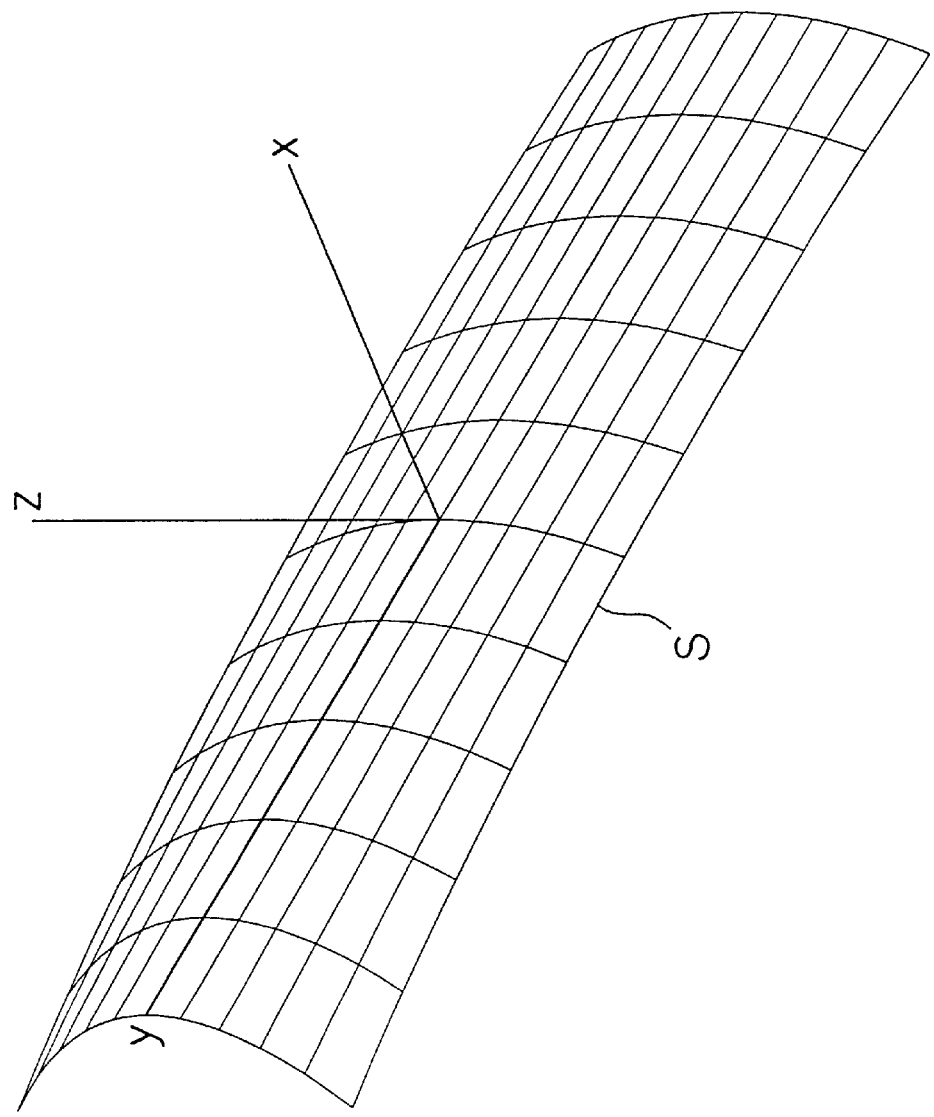
FIG. 30 is a perspective view schematically showing an example of the shape of a mirror or lens surface of the scanning optical system (with z of degree 2)

FIG. 29 shows the shape of a surface having z of degree 1. Here, the surface is so shaped that a section thereof parallel to the xz plane is a line and that this line, as it moves along the y axis, rotates such that the entire surface is twisted. FIG. 30 shows the shape of a surface having z of degree 2. Here, the surface is so shaped that a section thereof along the xz plane is a quadratic curve and that this curve, as it moves along the y axis, changes its shape.

Figure 31:
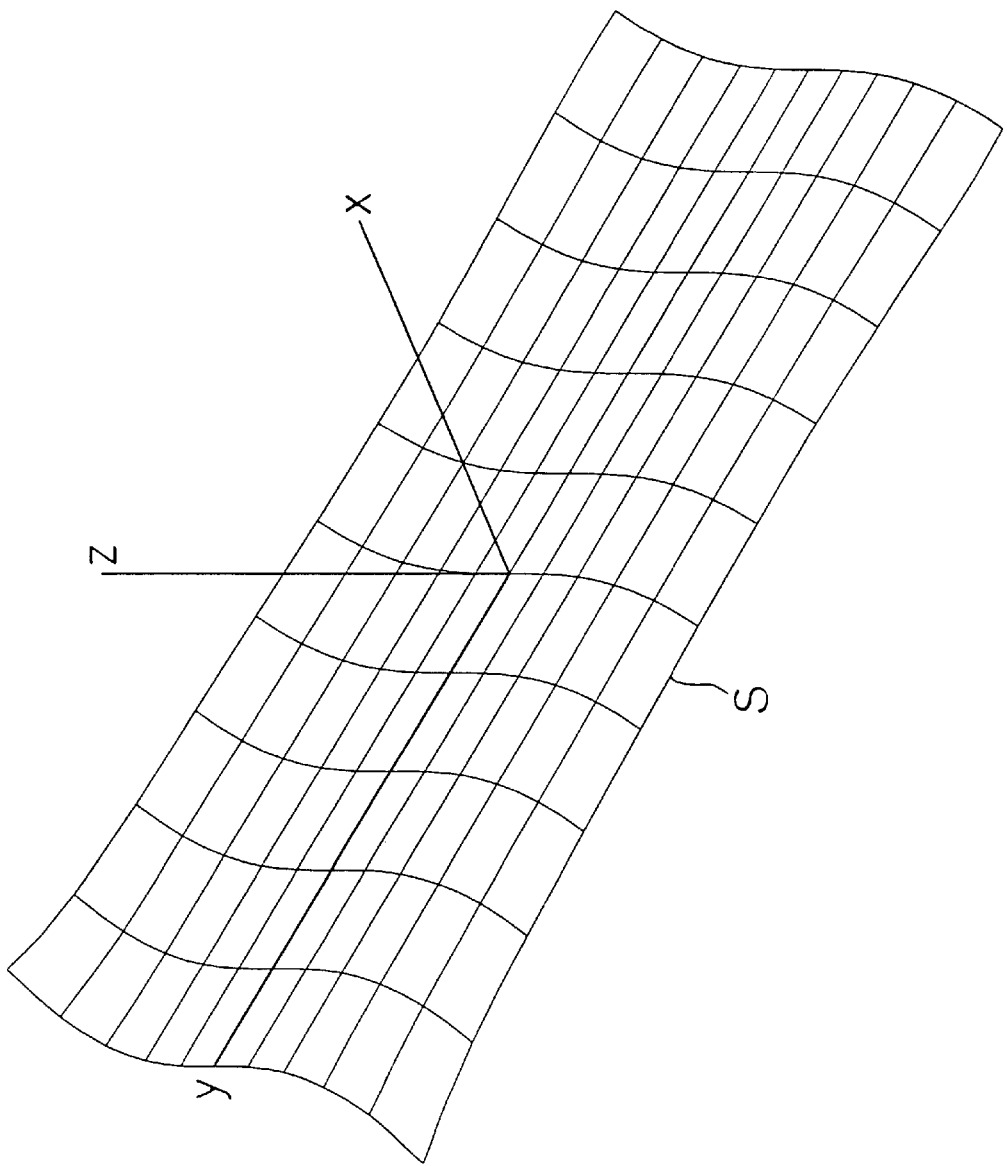
FIG. 31 is a perspective view schematically showing an example of the shape of a mirror or lens surface of the scanning optical system (with z of degree 3)
Figure 32:
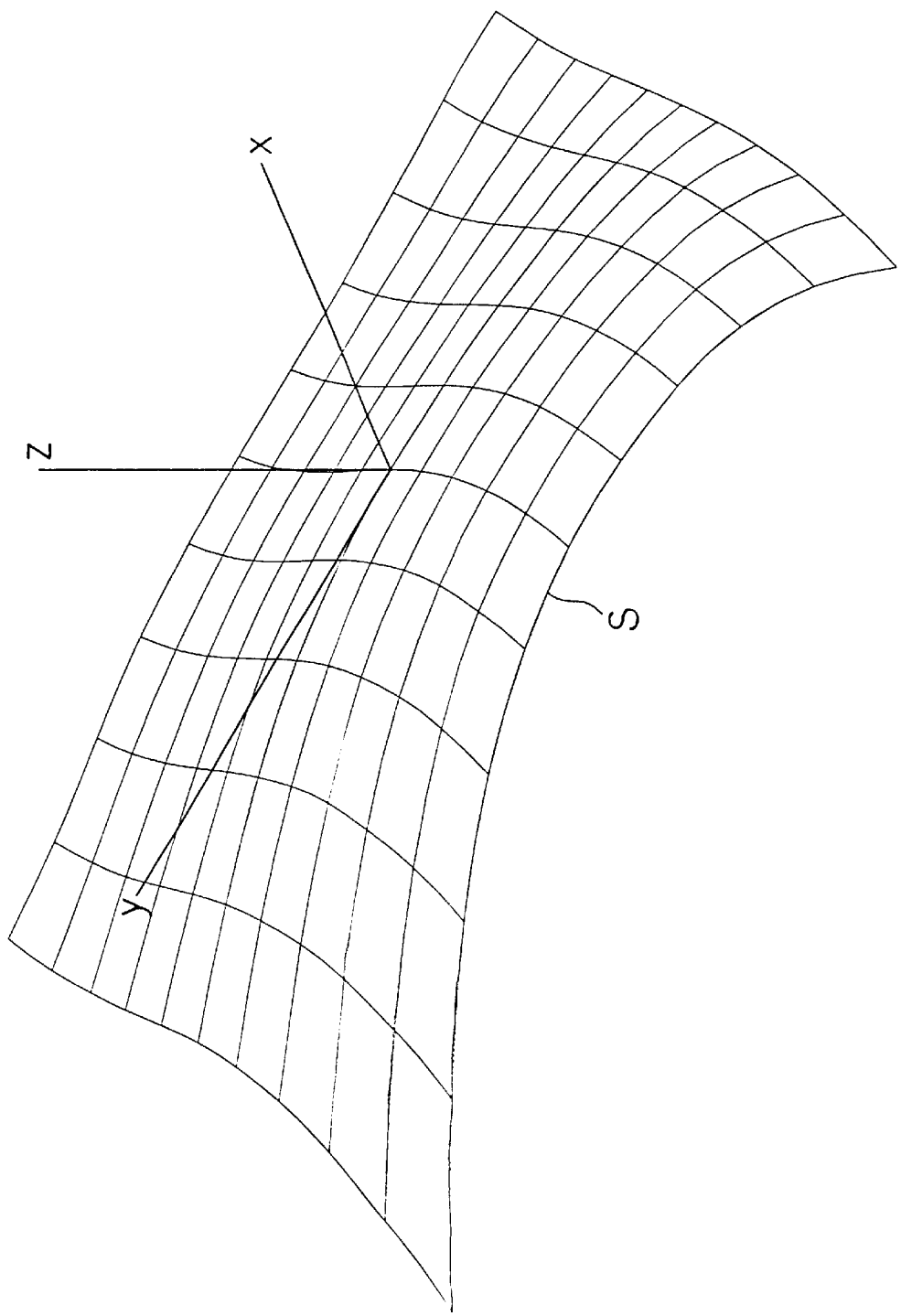
FIG. 32 is a perspective view schematically showing an example of the shape of a mirror or lens surface of the scanning optical system (composite)

FIG. 31 shows the shape of a surface having z of degree 3. Here, the surface is so shaped that a section thereof along the xz plane is a cubic curve and that this curve, as it moves along the y axis, changes its shape. FIG. 32 shows the shape of a composite surface obtained by integrating together the shapes of the surfaces having z of degree 0 to 3 described above. In this way, the shape of a mirror or lens surface is determined by selecting and integrating together various surface shapes each having z of a different degree and expressed by a polynomial in y.

Figure 33A:
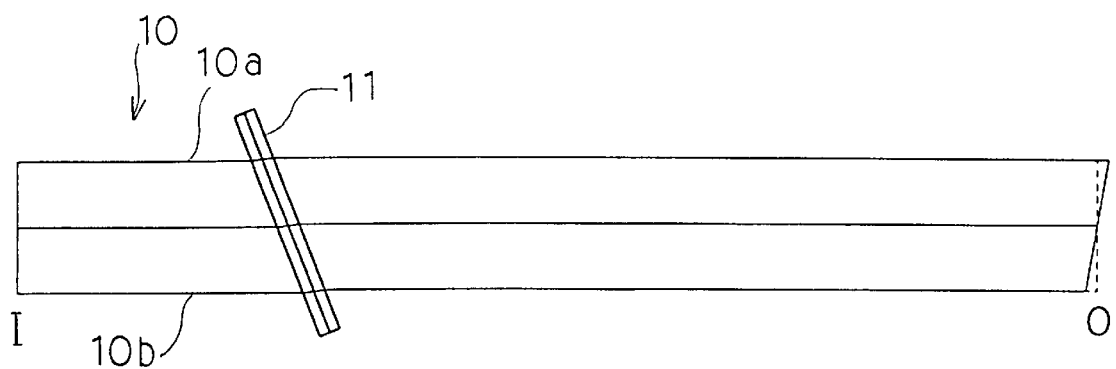
FIGS. 33A and 33B are diagrams showing the principle of how groove-shaped aberration occurs when a beam is obliquely incident on the cylindrical lens.
Figure 33B:
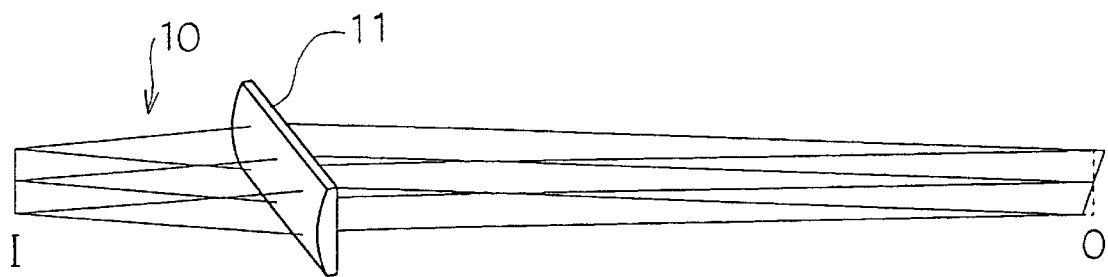

FIGS. 33A, 33B, 34A, 34B, 34C, 35A, and 35B are diagrams showing the principle of how groove-shaped aberration occurs. FIGS. 33A and 33B show how groove-shaped aberration occurs when a beam 10, parallel in the main scanning direction and divergent in the sub scanning direction, is obliquely incident on the cylindrical lens 11, with FIG. 33A showing a plan view and FIG. 33B showing a perspective view as seen from the upper front. Here, how an image is formed when a beam is incident on a thin cylindrical lens (having a cylindrical surface on the entrance side and a flat surface on the exit side) inclined in the main scanning direction is given by $$c\left(\frac{\sqrt{n^2 - \sin^2\theta}}{\cos\theta} - 1\right) = -\frac{1}{a} + \frac{1}{b} \quad (3)$$

where c represents the curvature of the cylindrical surface as viewed on a sectional plane along the sub scanning direction, n represents the refractive index, θ represents the angle of incidence in the main scanning direction, a represents the position on which the incident beam is focused in the sub scanning direction, and b represents the position on which the exiting beam is focused in the sub scanning direction.

Hence, the distance b-a between the position on which the incident beam is focused in the sub scanning direction and the position on which the exiting beam is focused in the sub scanning direction is smallest when $$-a = b = 2\left(\frac{1}{c\left(\frac{\sqrt{n^2 - \sin^2\theta}}{\cos\theta} - 1\right)}\right) \quad (4)$$

and, the more the value of a differs from this value, the greater the distance.

In FIGS. 33A and 33B, the entrance-side focus position I of the beam 10 is located closer to the cylindrical lens 11 than its exit-side focus position O is, and, as shown in FIG. 33A, the entrance-side focus position I of an upper ray 10a of the beam 10 is still closer to the cylindrical lens 11 than that of a lower ray 10b is. As a result, upper and lower rays have different distances between their entrance-side and exit-side focus positions; that is, they are focused on different positions.

Figure 34A:
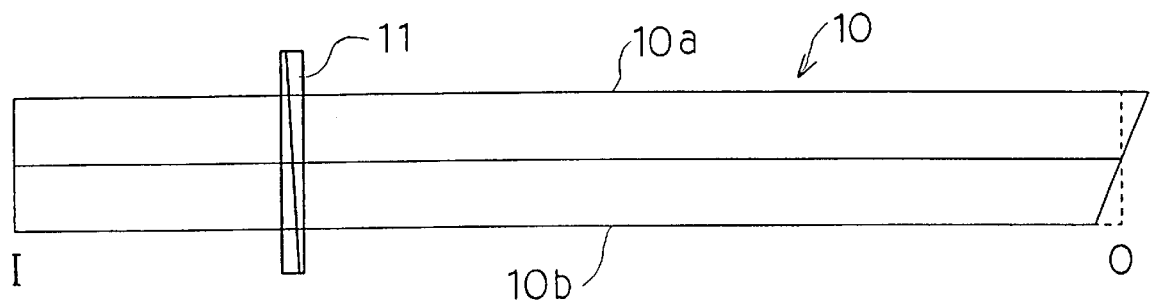
FIGS. 34A, 34B, and 34C are diagrams showing the principle of how groove-shaped aberration occurs when the curvature in the sub scanning direction varies with the position in the main scanning direction.
Figure 34B:
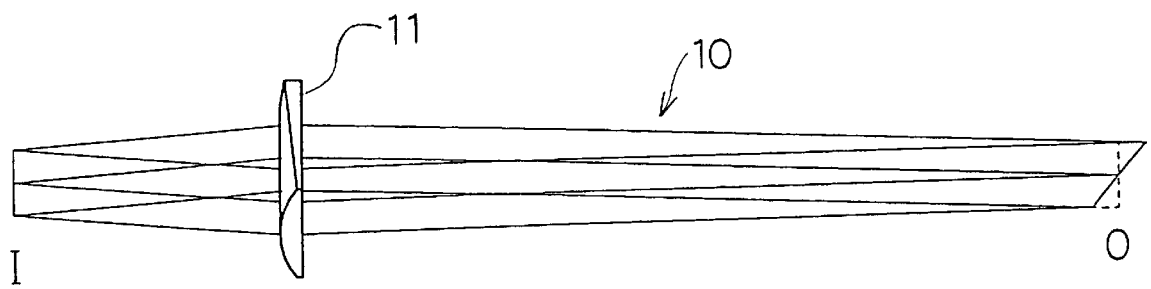
Figure 34C:
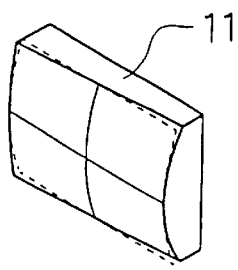

FIGS. 34A, 34B, and 34C show how groove-shaped aberration occurs when the curvature of the cylindrical lens 11 varies with the position in the main scanning direction, with FIG. 34A showing a plan view, FIG. 34B showing a perspective view as seen from the upper front, and FIG. 34C showing a perspective view of the cylindrical lens 11. Here, the sharper the curvature, the closer the exit-side focus position is to the lens. Thus, as shown in FIG. 34A, the exit-side focus position O of a lower ray 10b of the beam 10 is closer to the cylindrical lens 11 than that of an upper ray 10a is. As a result, also here, upper and lower rays are focused on different positions.

Figure 35A:
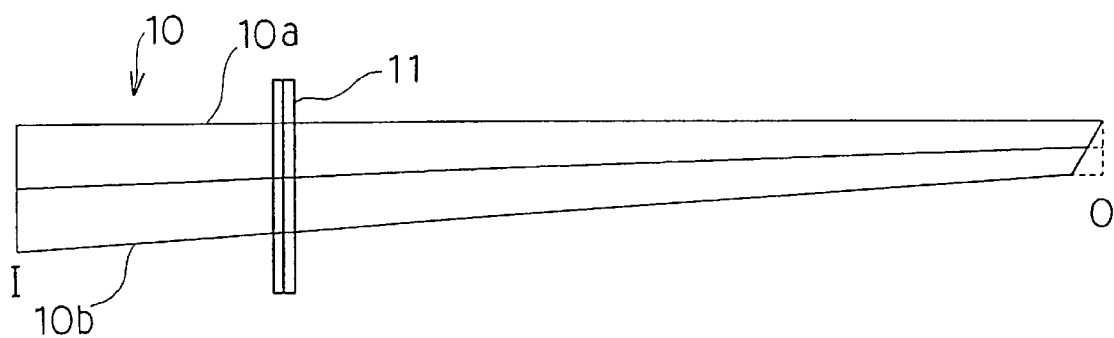
FIGS. 35A and 35B are diagrams showing the principle of how groove-shaped aberration occurs when the incident beam is not a parallel beam in the main scanning direction.
Figure 35B:
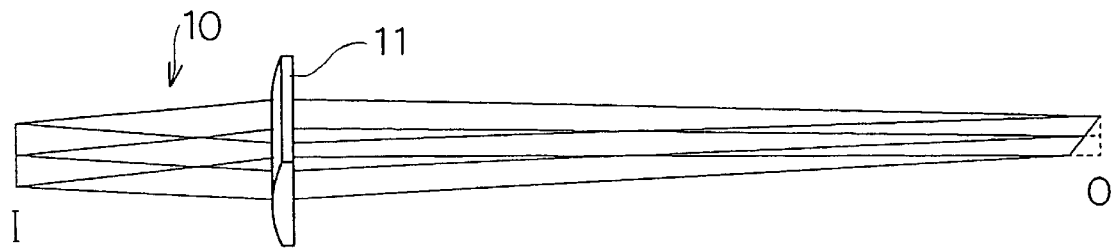

FIGS. 35A and 35B show how groove-shaped aberration occurs when the incident beam is not a parallel beam in the main scanning direction, with FIG. 35A showing a plan view and FIG. 35B showing a perspective view as seen from the upper front. Here, as shown in FIG. 35A, the angle of incidence of a lower ray 10b of the beam 10 with respect to the cylindrical lens 11 is larger than that of an upper ray 10a. Thus, the cylindrical lens 11 is inclined differently at different positions in the main scanning direction within the incident beam. As a result, also here, upper and lower rays are focused on different positions. This is the principle of how groove-shaped aberration occurs.

TABLE 1

| Surface No. | Curvature | Axial Distance | Refractive Index |
| --- | --- | --- | --- |
| r0 | — | 43 | 1 |
| r1 | −2.9614930E−02 | 6 | 1.52440 |
| r2 | free-form | 22 | 1 |
| r3 | −7.2039334E−03 | 9 | 1.52440 |
| r4 | axisymmetric aspherical | 45.4 | 1 |
| r5 | free-form | 7 | 1.52440 |
| r6 | 0 | 243.3 | 1 |
| r7 | 0 | — | — |

TABLE 2

| | z | |
| --- | --- | --- |
| y | 0 | 2 |
| 0 | 0 | −1.1303194E−02 |
| 1 | 0 | −1.0365466E−06 |
| 2 | −1.5766854E−02 | −5.7053384E−06 |
| 3 | −5.6055767E−07 | −1.6848420E−08 |
| 4 | −2.8870724E−06 | −1.0224883E−08 |
| 5 | −8.5556844E−11 | 5.6164621E−11 |
| 6 | −1.1333324E−09 | 1.0984426E−11 |
| 7 | −9.3257049E−13 | −1.0962697E−13 |
| 8 | −6.5072896E−13 | −3.2761235E−14 |
| 9 | 3.2560041E−16 | 8.9415685E−17 |
| 10 | −6.0335090E−16 | 1.4318518E−17 |

TABLE 3

| | z | |
| --- | --- | --- |
| y | 0 | 2 |
| 0 | 0 | 1.0885661E−02 |
| 1 | 5.9194933E−03 | −6.3259373E−07 |
| 2 | −3.4168038E−04 | −3.9936619E−07 |
| 3 | −2.7175168E−07 | 1.6837565E−10 |
| 4 | 2.0302316E−07 | −6.6728986E−11 |
| 5 | 7.0776797E−12 | 4.1722262E−14 |
| 6 | −2.0026679E−11 | 2.9073687E−14 |
| 7 | 1.3085114E−15 | −1.6888605E−17 |
| 8 | 1.2145043E−15 | −5.6979944E−18 |
| 9 | −2.8197099E−20 | 1.6270064E−21 |
| 10 | −5.2557420E−20 | 4.5881489E−22 |

TABLE 4

| Degree | Coefficient |
|---|---|
| 2 | −5.1843757E−03 |
| 4 | −1.5349345E−07 |
| 6 | −1.9337830E−11 |
| 8 | 1.6534571E−14 |
| 10 | −7.5887421E−18 |

TABLE 5

| Surface No. | Curvature | Axial Distance | Refractive Index |
|---|---|---|---|
| r0 | — | 33 | 1 |
| r1 | −3.3500558E−02 | 6 | 1.52440 |
| r2 | free-form | 32 | 1 |
| r3 | −7.2715925E−03 | 9 | 1.52440 |
| r4 | axisymmetric aspherical | 45.4 | 1 |
| r5 | free-form | 7 | 1.52440 |
| r6 | 0 | 243.3 | 1 |
| r7 | 0 | — | — |

TABLE 6

| | z | |
|---|---|---|
| y | 0 | 2 |
| 0 | 0 | −1.2406004E−02 |
| 1 | 0 | −5.8752365E−07 |
| 2 | −1.7389017E−02 | −7.9898161E−06 |
| 3 | −6.5995092E−07 | −5.7041156E−08 |
| 4 | −4.0936362E−06 | −2.7197502E−08 |
| 5 | 8.9502205E−11 | 3.6517852E−10 |
| 6 | −1.8469269E−09 | 7.9236879E−11 |
| 7 | −2.0731104E−12 | −1.0428960E−12 |
| 8 | −1.5809623E−12 | −2.5427452E−13 |
| 9 | 1.5549396E−15 | 1.1483823E−15 |
| 10 | −1.0889870E−15 | 2.0424945E−16 |

TABLE 7

| | z | |
|---|---|---|
| y | 0 | 2 |
| 0 | 0 | 1.0865096E−02 |
| 1 | 5.3566563E−03 | −5.6564674E−07 |
| 2 | −1.2397949E−04 | −4.4243515E−07 |
| 3 | −2.4465775E−07 | 1.5305470E−10 |
| 4 | 1.4603633E−07 | −4.6640416E−11 |
| 5 | 1.5991006E−11 | 6.2165480E−14 |
| 6 | −1.3858633E−11 | 2.8052976E−14 |
| 7 | −4.8597618E−16 | −2.5342204E−17 |
| 8 | 7.9520971E−16 | −6.3572698E−18 |
| 9 | 5.6480423E−20 | 2.6073703E−21 |
| 10 | −3.3109811E−20 | 5.5337645E−22 |

TABLE 8

| Degree | Coefficient |
|---|---|
| 2 | −5.1272850E−03 |
| 4 | −1.7541756E−07 |
| 6 | −2.9275808E−11 |
| 8 | 1.1487360E−14 |
| 10 | −4.9997514E−18 |

TABLE 9

| Surface No. | Curvature | Axial Distance | Refractive Index |
|---|---|---|---|
| r0 | — | 33 | 1 |
| r1 | free-form | 6 | 1.52440 |
| r2 | −3.2905785E−02 | 32 | 1 |
| r3 | −4.0822740E−03 | 9 | 1.52440 |
| r4 | −8.1257028E−03 | 45.4 | 1 |
| r5 | 0 | 7 | 1.52440 |
| r6 | free-form | 243.3 | 1 |
| r7 | 0 | — | — |

TABLE 10

| | z | |
|---|---|---|
| y | 0 | 2 |
| 0 | 0 | −2.0200826E−02 |
| 1 | 0 | −9.6839383E−06 |
| 2 | −1.6141472E−02 | −7.3224592E−06 |
| 3 | 1.0207969E−07 | 4.8168796E−08 |
| 4 | −5.4847757E−06 | 1.0243171E−08 |
| 5 | 2.3865344E−09 | −5.6670207E−10 |
| 6 | −3.2872862E−09 | −1.1601224E−10 |
| 7 | −3.1341851E−12 | 2.1699347E−12 |
| 8 | −1.8354192E−13 | 3.0584008E−13 |
| 9 | 2.1058030E−15 | −3.0980494E−15 |
| 10 | −7.6175348E−15 | −2.4355178E−16 |

TABLE 11

| | z | |
|---|---|---|
| y | 0 | 2 |
| 0 | 0 | −1.0431615E−02 |
| 1 | −5.4415239E−03 | −6.4854787E−07 |
| 2 | 2.2814003E−04 | 4.4343671E−07 |
| 3 | 1.5723959E−07 | 4.4616514E−13 |
| 4 | −1.2955445E−07 | −4.6479331E−11 |
| 5 | −1.7042958E−11 | −3.5185044E−14 |
| 6 | 1.4526452E−11 | −1.6716891E−15 |
| 7 | 1.6150423E−15 | 1.2955855E−17 |
| 8 | −1.6034100E−15 | 1.7573924E−18 |
| 9 | −1.3060436E−19 | −1.3969766E−21 |
| 10 | 8.1327806E−20 | −1.9766295E−22 |

TABLE 12

| Surface No. | Curvature | Axial Distance | Refractive Index |
|---|---|---|---|
| r0 | — | 43 | 1 |
| r1 | −2.3561364E−02 | 6 | 1.52440 |
| r2 | free-form | 22 | 1 |
| r3 | 2.0758650E−04 | 9 | 1.52440 |
| r4 | free-form | 45.4 | 1 |
| r5 | free-form | 7 | 1.52440 |
| r6 | 0 | 243.3 | 1 |
| r7 | 0 | — | — |

TABLE 13

| | z | |
|---|---|---|
| y | 0 | 2 |
| 0 | 0 | −6.5212783E−03 |
| 1 | 0 | 1.6623899E−05 |
| 2 | −1.2040525E−02 | 2.8542807E−05 |
| 3 | −6.2237691E−07 | −2.8061243E−08 |

TABLE 13-continued

| y | z=0 | z=2 |
|---|---|---|
| 4 | −2.0222723E−06 | −6.1997977E−09 |
| 5 | −9.2050984E−11 | −7.0920233E−11 |
| 6 | −2.8663482E−10 | −1.0579309E−11 |
| 7 | −5.2270508E−13 | 1.6533161E−13 |
| 8 | −2.3131738E−13 | −1.1126817E−13 |
| 9 | 2.6804318E−16 | −7.3173049E−17 |
| 10 | −3.6380550E−17 | 1.2197005E−16 |

TABLE 14

| y | z=0 | z=2 |
|---|---|---|
| 0 | 0 | −3.4404116E−03 |
| 2 | −2.4898938E−03 | −1.2579786E−05 |
| 4 | 4.6688234E−07 | 7.2464308E−09 |
| 6 | −1.3203194E−10 | −5.3694653E−13 |
| 8 | 2.0969569E−14 | −5.9625408E−16 |
| 10 | −1.9447268E−18 | 1.1987014E−19 |

TABLE 15

| y | z=0 | z=2 |
|---|---|---|
| 0 | 0 | 1.0701320E−02 |
| 1 | 6.4721016E−03 | 9.6398924E−07 |
| 2 | −2.3947388E−04 | −2.2293458E−06 |
| 3 | −3.0639097E−07 | −3.2347601E−10 |
| 4 | 2.1564148E−07 | 2.5834128E−10 |
| 5 | 1.1603248E−11 | 1.5000666E−15 |
| 6 | −2.9233641E−11 | 7.0670065E−14 |
| 7 | 1.0732926E−15 | 1.5862240E−17 |
| 8 | 2.4269530E−15 | −2.1915824E−17 |
| 9 | −5.0113655E−20 | −1.5517500E−21 |
| 10 | −1.0347576E−19 | 1.5887600E−21 |

TABLE 16

| Surface No. | Curvature | Axial Distance | Refractive Index |
|---|---|---|---|
| r0 | — | 43 | 1 |
| r1 | free-form | 12 | 1.52440 |
| r2 | free-form | 72 | 1 |
| r3 | free-form | 5 | 1.52440 |
| r4 | 0 | 131.74 | 1 |
| r5 | 0 | — | — |

TABLE 17

| y | z=0 | z=2 |
|---|---|---|
| 0 | 0 | −1.5052120E−03 |
| 2 | −8.0896689E−03 | 2.2036143E−05 |
| 4 | 0 | 1.0911532E−08 |
| 6 | 0 | −1.0593027E−11 |
| 8 | 0 | 2.0568300E−14 |
| 10 | 0 | −6.2216250E−18 |

TABLE 18

| y | z=0 | z=2 |
|---|---|---|
| 0 | 0 | −1.7830306E−02 |
| 1 | 0 | −3.3576992E−06 |
| 2 | −1.3016162E−02 | 8.5668605E−06 |
| 3 | −1.5506397E−06 | 5.2313978E−10 |
| 4 | −8.0485475E−07 | 8.6654174E−09 |
| 5 | 1.1884937E−10 | 5.9970074E−12 |
| 6 | −1.1278948E−10 | 6.7075969E−12 |
| 7 | −2.8996625E−14 | −9.6455915E−15 |
| 8 | 1.6945738E−14 | −5.7245879E−15 |
| 9 | −1.5666221E−17 | 7.0319677E−18 |
| 10 | −5.1657552E−17 | 8.8654488E−18 |

TABLE 19

| y | z=0 | z=2 |
|---|---|---|
| 0 | 0 | 8.3738778E−03 |
| 1 | 2.2839631E−03 | −2.0302399E−06 |
| 2 | −2.1662530E−03 | 8.4743104E−07 |
| 3 | −7.5666835E−07 | 1.3456478E−09 |
| 4 | 4.5213842E−07 | −3.0026334E−10 |
| 5 | 1.3193794E−10 | −3.3717628E−13 |
| 6 | −4.3161694E−11 | 4.2981974E−14 |
| 7 | −1.1772545E−14 | 4.4211107E−17 |
| 8 | 2.5583626E−15 | −3.1443878E−18 |
| 9 | 4.0225113E−19 | −2.3055873E−21 |
| 10 | −6.9076988E−10 | 9.0659041E−23 |

TABLE 20

| Surface No. | Curvature | Axial Distance | Refractive Index |
|---|---|---|---|
| r0 | — | 33 | 1 |
| r1 | free-form | 6 | 1.52440 |
| r2 | free-form | 32 | 1 |
| r3 | −1.0239979E−02 | 9 | 1.52440 |
| r4 | −1.5016736E−02 | 45.4 | 1 |
| r5 | 0 | 7 | 1.52440 |
| r6 | free-form | 243.3 | 1 |
| r7 | 0 | — | — |

TABLE 21

| y | z=0 | z=2 |
|---|---|---|
| 0 | 0 | −4.6527956E−02 |
| 1 | 0 | −9.6434476E−05 |
| 2 | −1.6134477E−02 | −6.1978122E−04 |
| 3 | 1.7734108E−06 | 4.9205984E−07 |
| 4 | 5.1160876E−07 | 1.8276578E−07 |
| 5 | −2.7580813E−09 | 1.9599590E−10 |
| 6 | −1.9718008E−09 | 3.2421655E−09 |
| 7 | 5.9906769E−12 | −5.2393205E−12 |
| 8 | 2.1402429E−12 | −4.5346643E−12 |
| 9 | −5.2484010E−15 | 7.4060660E−15 |
| 10 | −1.6703782E−15 | 3.0653046E−15 |

TABLE 22

| y | z=0 | z=2 |
|---|---|---|
| 0 | 0 | −3.5631866E−02 |
| 2 | −1.6354955E−02 | −3.1361789E−04 |
| 4 | 0 | 3.3419759E−07 |
| 6 | 0 | 3.2780612E−11 |
| 8 | 0 | −2.2944942E−13 |
| 10 | 0 | 4.8578728E−16 |

TABLE 23

| y | z=0 | z=2 |
|---|---|---|
| 0 | 0 | −9.7205781E−03 |
| 1 | −7.7508554E−03 | −3.1954971E−06 |
| 2 | 7.5990011E−04 | 1.1509224E−06 |
| 3 | 4.3328494E−07 | 1.8397698E−09 |
| 4 | −2.0388458E−07 | −3.3550599E−10 |
| 5 | −9.0144923E−11 | −5.9083868E−13 |
| 6 | 2.0949522E−11 | 5.7416385E−14 |
| 7 | 1.0683035E−14 | 8.8652056E−17 |
| 8 | −1.7093685E−15 | −5.8581408E−18 |
| 9 | −5.6542189E−19 | −5.3077871E−21 |
| 10 | 6.6657266E−20 | 2.6120640E−22 |

TABLE 24

| Surface No. | Curvature | Axial Distance | Refractive Index |
|---|---|---|---|
| r0 | — | 43 | 1 |
| r1 | −8.4195131E−03 | 12 | 1.51882 |
| r2 | free-form | 72 | 1 |
| r3 | free-form | 5 | 1.52440 |
| r4 | 0 | 131.48 | 1 |
| r5 | 0 | — | — |

TABLE 25

| y | z=0 | z=2 |
|---|---|---|
| 0 | 0 | −2.0170162E−02 |
| 1 | 0 | 1.0476570E−05 |
| 2 | −9.3212312E−03 | −1.7975375E−06 |
| 3 | 1.7947096E−06 | −3.0307759E−09 |
| 4 | −2.9981042E−07 | −7.8279473E−10 |
| 5 | 2.1933776E−10 | 6.0445903E−13 |
| 6 | −4.9109804E−11 | −2.4892396E−13 |
| 7 | −1.2391270E−14 | −1.9260423E−16 |
| 8 | −1.0382174E−14 | −4.0217450E−17 |
| 9 | 3.0993062E−17 | 5.1365631E−19 |
| 10 | −1.0213057E−17 | −2.0526499E−20 |

TABLE 26

| y | z=0 | z=2 |
|---|---|---|
| 0 | 0 | 8.1377553E−03 |
| 1 | −2.3684198E−02 | 2.8125966E−06 |
| 2 | −1.5090566E−03 | 2.0353574E−07 |
| 3 | 1.2526268E−06 | −3.9838134E−10 |
| 4 | 2.7616431E−07 | −1.1117373E−10 |
| 5 | −5.1519070E−11 | 1.0668551E−14 |

TABLE 26-continued

| y | z=0 | z=2 |
|---|---|---|
| 6 | −2.1304920E−11 | 1.5112495E−14 |
| 7 | 5.8881834E−17 | 3.2956146E−18 |
| 8 | 1.0278810E−15 | −1.0551224E−18 |
| 9 | 2.6668755E−20 | −2.4974114E−22 |
| 10 | −2.3144943E−20 | 3.1928905E−23 |

TABLE 27

| Surface No. | Curvature | Axial Distance | Refractive Index |
|---|---|---|---|
| r0 | — | 43 | 1 |
| r1 | −2.8271945E−03 | 12 | 1.51882 |
| r2 | free-form | 72 | 1 |
| r3 | 0 | 5 | 1.52440 |
| r4 | free-form | 131.48 | 1 |
| r5 | 0 | — | — |

TABLE 28

| y | z=0 | z=2 |
|---|---|---|
| 0 | 0 | −1.8369772E−02 |
| 1 | 0 | 6.3567340E−06 |
| 2 | −6.4484386E−03 | −4.9165589E−07 |
| 3 | 5.5654769E−07 | −4.4145198E−09 |
| 4 | 8.4909915E−08 | −2.6476260E−12 |
| 5 | −3.6684823E−10 | 3.5957348E−13 |
| 6 | −1.6754337E−12 | −1.3799188E−14 |
| 7 | −2.4830027E−13 | 2.0941239E−17 |
| 8 | −4.7295417E−14 | −1.7648071E−17 |
| 9 | 1.2479735E−16 | 2.0163673E−20 |
| 10 | 1.4115691E−17 | 2.8064388E−21 |

TABLE 29

| y | z=0 | z=2 |
|---|---|---|
| 0 | 0 | −8.1991659E−03 |
| 1 | −1.8679981E−02 | −2.1043179E−06 |
| 2 | 1.0135058E−03 | 3.2560882E−07 |
| 3 | 3.5711642E−07 | 1.8958215E−10 |
| 4 | −1.7831342E−07 | −4.7078551E−11 |
| 5 | −6.2725351E−11 | −2.4605988E−14 |
| 6 | 1.4583490E−11 | 5.9641307E−15 |
| 7 | 1.1675521E−14 | 3.7986253E−18 |
| 8 | −6.9644458E−16 | −4.4100737E−19 |
| 9 | −7.6448624E−19 | −2.7601554E−22 |
| 10 | 8.9724876E−21 | 1.2392394E−23 |

TABLE 30

| | | x-Component | y-Component | z-Component |
|---|---|---|---|---|
| First Mirror | Position | 60 | 0 | 0 |
| | x-Axis Vector | 0.9848 | 0 | −0.1736 |
| | y-Axis Vector | 0 | 1 | 0 |
| Second Mirror | Position | 20 | 0 | 14.559 |
| | x-Axis Vector | −0.866 | 0 | 0.5 |
| | y-Axis Vector | 0 | 1 | 0 |

TABLE 30-continued

|  |  | x-Component | y-Component | z-Component |
|---|---|---|---|---|
| Evaluation Surface | Position | 155.67 | 0 | −99.279 |
|  | x-Axis Vector | 0.6428 | 0 | −0.766 |
|  | y-Axis Vector | 0 | 1 | 0 |

TABLE 31

| | z | | |
|---|---|---|---|
| y | 0 | 1 | 2 |
| 0 | 0 | 0 | 1.1926280E−02 |
| 1 | 1.3138909E−03 | −1.9802222E−06 | −5.2598226E−06 |
| 2 | −8.0088171E−04 | 5.9013359E−06 | −2.1753213E−07 |
| 3 | −6.2497293E−07 | −2.0477483E−08 | 1.8321302E−09 |
| 4 | 1.0045389E−07 | 1.5338682E−09 | −1.7949137E−10 |
| 5 | 1.8447839E−10 | 1.1555865E−11 | −3.3562130E−13 |
| 6 | −1.5832493E−11 | 1.4191991E−13 | 3.3926681E−14 |
| 7 | −2.7332177E−14 | −3.4657315E−15 | 0 |
| 8 | 2.8003746E−15 | −1.5084493E−16 | 0 |
| 9 | 1.6206543E−18 | 4.5323455E−19 | 0 |
| 10 | −3.0639922E−19 | 1.1375935E−20 | 0 |

TABLE 32

| | z | | | |
|---|---|---|---|---|
| y | 0 | 1 | 2 | 3 |
| 0 | 0 | 0 | −5.6323277E−03 | 7.1789619E−06 |
| 1 | 0 | −1.0563706E−06 | 2.9619345E−07 | −2.4513167E−09 |
| 2 | −5.0702053E−04 | 1.6075031E−06 | −3.0216945E−08 | 2.4415129E−10 |
| 3 | 2.9031783E−07 | −2.6679665E−09 | −2.1651061E−12 | 6.0118482E−13 |
| 4 | −4.0889767E−08 | 2.5112361E−10 | 8.3920014E−13 | 1.6605820E−14 |
| 5 | −3.9099536E−11 | 8.7413401E−13 | −4.1508539E−15 | −1.0225565E−16 |
| 6 | 3.4008461E−12 | −2.4927668E−14 | −1.4218618E−17 | 1.3198269E−18 |
| 7 | 2.4116413E−15 | −1.3401002E−16 | 1.0300105E−18 | 0 |
| 8 | −2.8781052E−16 | 3.6678020E−18 | −1.9377955E−20 | 0 |
| 9 | −4.7601015E−20 | 8.1347887E−21 | −6.8448519E−23 | 0 |
| 10 | 1.3388144E−20 | −3.4826841E−22 | 2.4859486E−24 | 0 |

What is claimed is:

1. A laser scanning apparatus comprising:

a light source device for emitting a laser beam;

a deflector for deflecting the laser beam so as to scan a scanned surface with the laser beam; and a scanning optical system disposed in an optical path of the laser beam so as to focus the laser beam on the scanned surface, wherein the scanning optical system is composed of three or more lens elements, of which a lens element disposed closest to the deflector and a lens element disposed closest to the scanned surface each have a surface that is so shaped that a curvature thereof as viewed on a sectional plane along a sub scanning direction varies independently of a shape thereof in a main scanning direction.

2. A laser scanning apparatus as claimed in claim 1, wherein the light source device includes a multiple-beam light source that emits a plurality of laser beams.

3. A laser scanning apparatus as claimed in claim 1, wherein the light source device has a plurality of light sources, and laser beams emitted from the plurality of light sources are integrated together so as to be focused on spots slightly apart from one another in the sub scanning direction on the deflector.

4. A laser scanning apparatus comprising:

a light source device for emitting a laser beam;

a deflector for deflecting the laser beam so as to scan a scanned surface with the laser beam; and a scanning optical system disposed in an optical path of the laser beam so as to focus the laser beam on the scanned surface, wherein the scanning optical system has at least three surfaces that are each so shaped that a curvature thereof as viewed on a sectional plane along a sub scanning direction varies independently of a shape thereof in a main scanning direction and are each provided on a different optical component.

5. A laser scanning apparatus as claimed in claim 4, wherein at least two of the surfaces that are each so shaped that the curvature thereof as viewed on a sectional plane along the sub scanning direction varies independently of the shape thereof in the main scanning direction are so shaped as to be laterally asymmetrical.

6. A laser scanning apparatus as claimed in claim 4, wherein the light source device includes a multiple-beam light source that emits a plurality of laser beams.

7. A laser scanning apparatus as claimed in claim 4, wherein the light source device has a plurality of light sources, and laser beams emitted from the plurality of light sources are integrated together so as to be focused on spots slightly apart from one another in the sub scanning direction on the deflector.

\* \* \* \* \*